United States Patent [19]

Bowman

[11] Patent Number: 4,999,178
[45] Date of Patent: Mar. 12, 1991

[54] THERMOCHEMICAL CYCLE FOR SPLITTING HYDROGEN SULFIDE

[76] Inventor: Melvin G. Bowman, 60 White Barn Dr., Pleasant View, Utah 84404

[21] Appl. No.: 281,463

[22] Filed: Dec. 8, 1988

[51] Int. Cl.$^5$ .............. C01B 17/04; C01B 3/06; C01B 31/26

[52] U.S. Cl. .................. 423/571; 423/416; 423/648.1

[58] Field of Search .......... 423/416, 512 R, 571, 423/415 A, 648.1, 658.2, 655, 656

[56] References Cited

U.S. PATENT DOCUMENTS

| | | | |
|---|---|---|---|
| 3,783,116 | 1/1974 | Haas et al. | 423/415 A |
| 3,856,925 | 12/1974 | Kodera et al. | 423/416 |
| 4,233,180 | 11/1980 | Hausberger et al. | 423/655 |
| 4,432,960 | 2/1984 | Herrington et al. | 423/655 |
| 4,447,409 | 5/1984 | McGuiggan et al. | 423/416 |
| 4,522,793 | 6/1985 | Larson et al. | 423/416 |
| 4,671,946 | 6/1987 | de Kraa et al. | 423/416 |

FOREIGN PATENT DOCUMENTS

| | | | |
|---|---|---|---|
| 1196624 | 7/1965 | Fed. Rep. of Germany | 423/416 |
| 49996 | 4/1979 | Japan | 423/415 A |

OTHER PUBLICATIONS

Mellor, *A Comprehensive Treatise on Inorganic and Theoretical Chemistry*, Longmans, Green and Co. 1946, vol. V, pp. 972, 974, 975.

*Primary Examiner*—Jeffrey E. Russel
*Attorney, Agent, or Firm*—A. Ray Osburn

[57] ABSTRACT

A thermochemical cycle for the recovery of hydrogen and sulfur by splitting hydrogen sulfide, based upon initial reactions between the hydrogen sulfide and carbon dioxide or carbon monoxide. The cycle exists in three versions, two utilizing the initial reaction of hydrogen sulfide and carbon dioxide. One of these versions utilizes high temperature for the initial step for production of carbon monoxide for use in the shift reaction to produce hydrogen. The other conducts the initial step of moderate temperature in the presence of a desiccant to increase the yields of carbonyl sulfide and carbon disulfide, which are subsequently subjected to high temperature reactions to produce the carbon monoxide for the shift reaction. The third version employs the reaction of hydrogen sulfide with carbon monoxide at moderate temperatures producing original hydrogen and fractions including carbonyl sulfide and carbon disulfide, which are later reacted at high temperatures for production of carbon monoxide and sulfur, the carbon monoxide being recycled to the initial reaction.

7 Claims, 6 Drawing Sheets

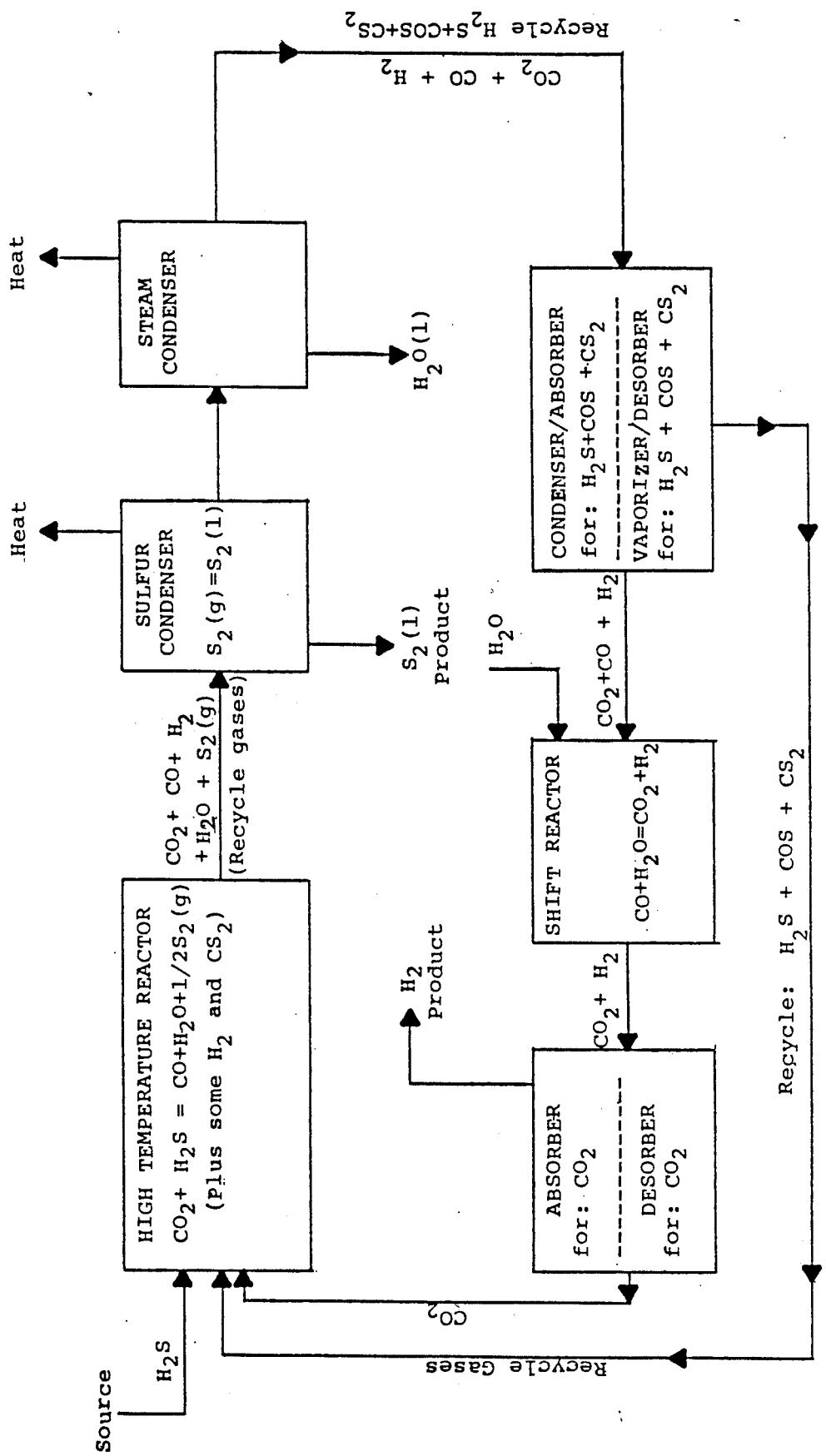
FIG. I-A

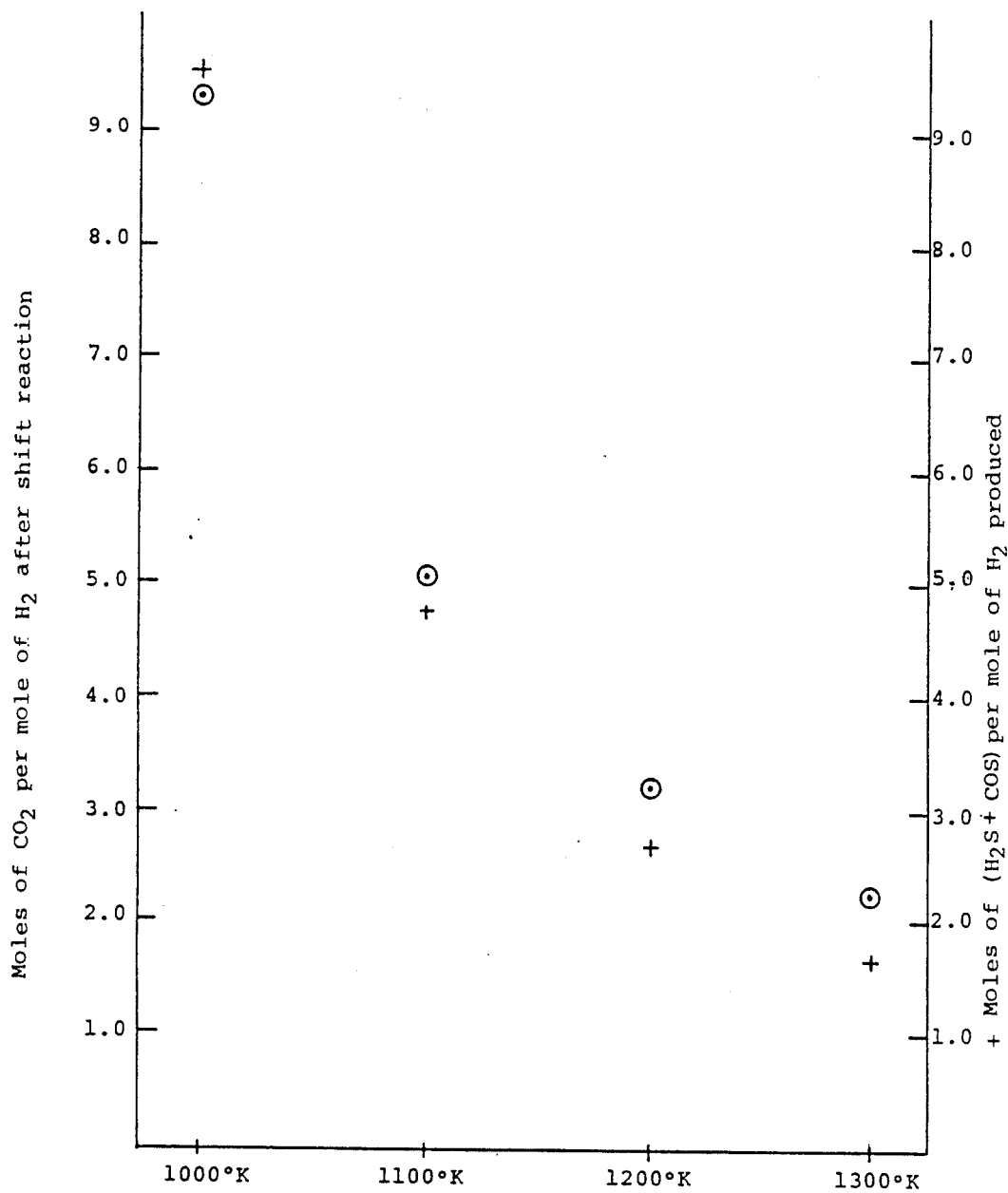
FIGURE I-B. SEPARATION RATIOS VERSUS TEMPERATURE
(OPERATING PRESSURE = 3ATM)
(INLET = EQUIMOLAR $CO_2/H_2S$)

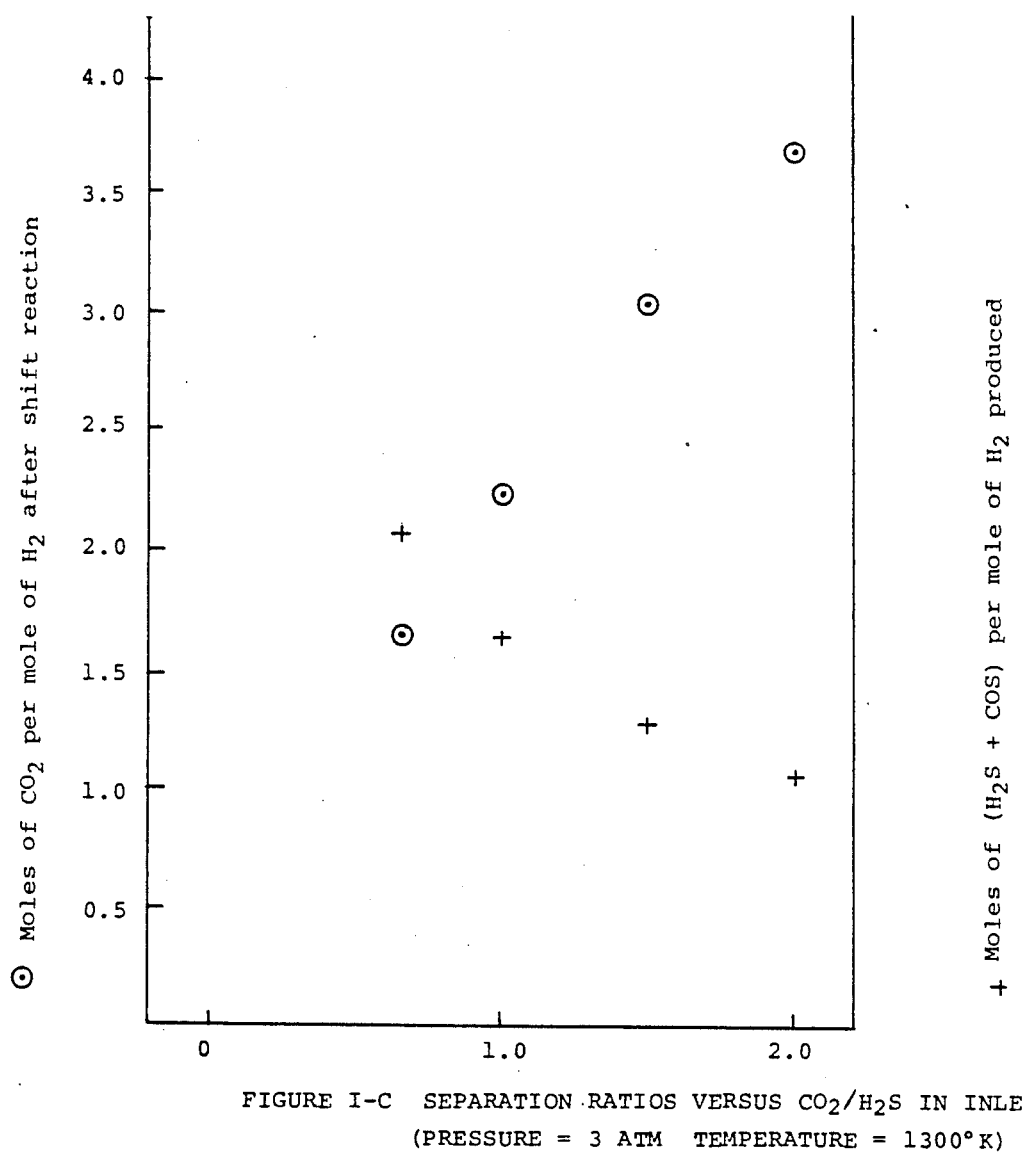
FIGURE I-C SEPARATION RATIOS VERSUS $CO_2/H_2S$ IN INLET
(PRESSURE = 3 ATM   TEMPERATURE = 1300°K)

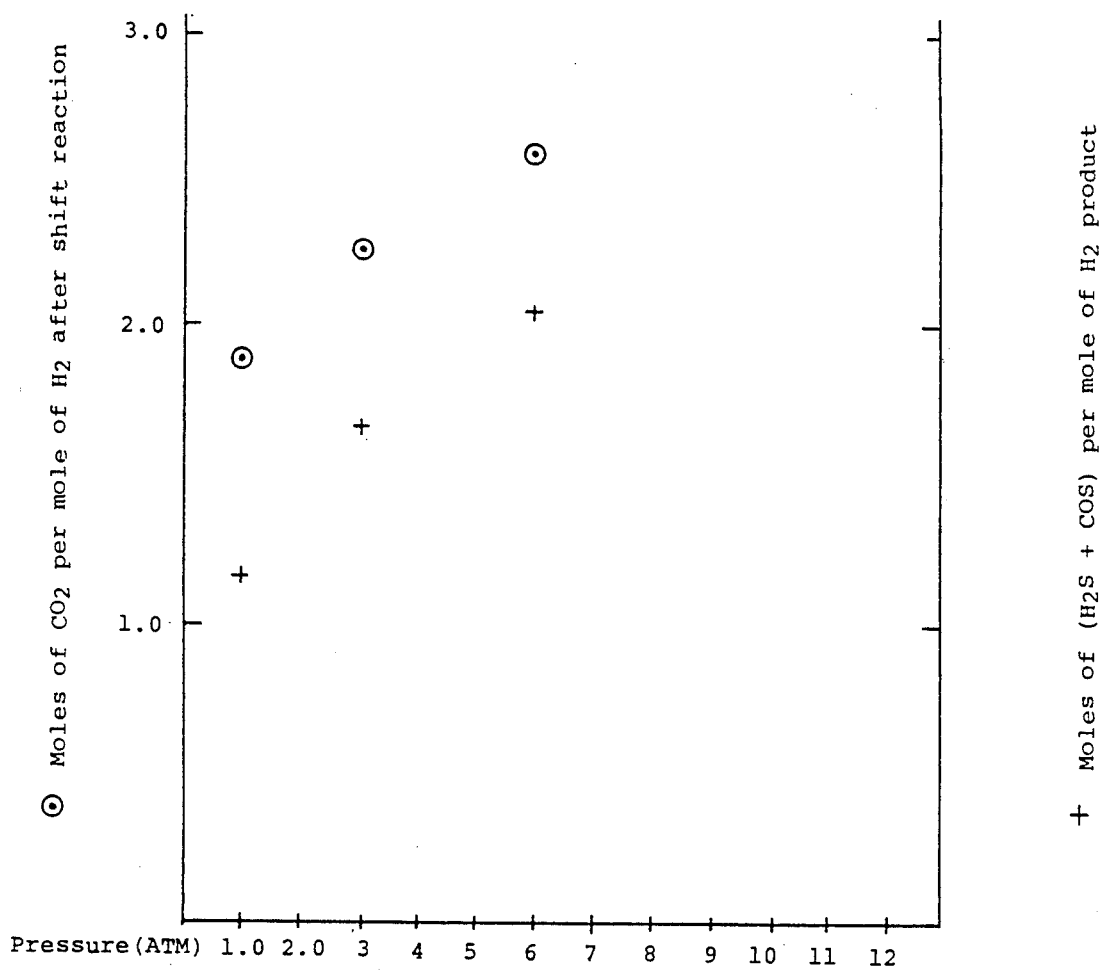
FIGURE I-D SEPARATION RATIOS VERSUS PRESSURE
(INLET GAS = 50-50   $CO_2 + H_2S$
(TEMPERATURE = 1300° K)

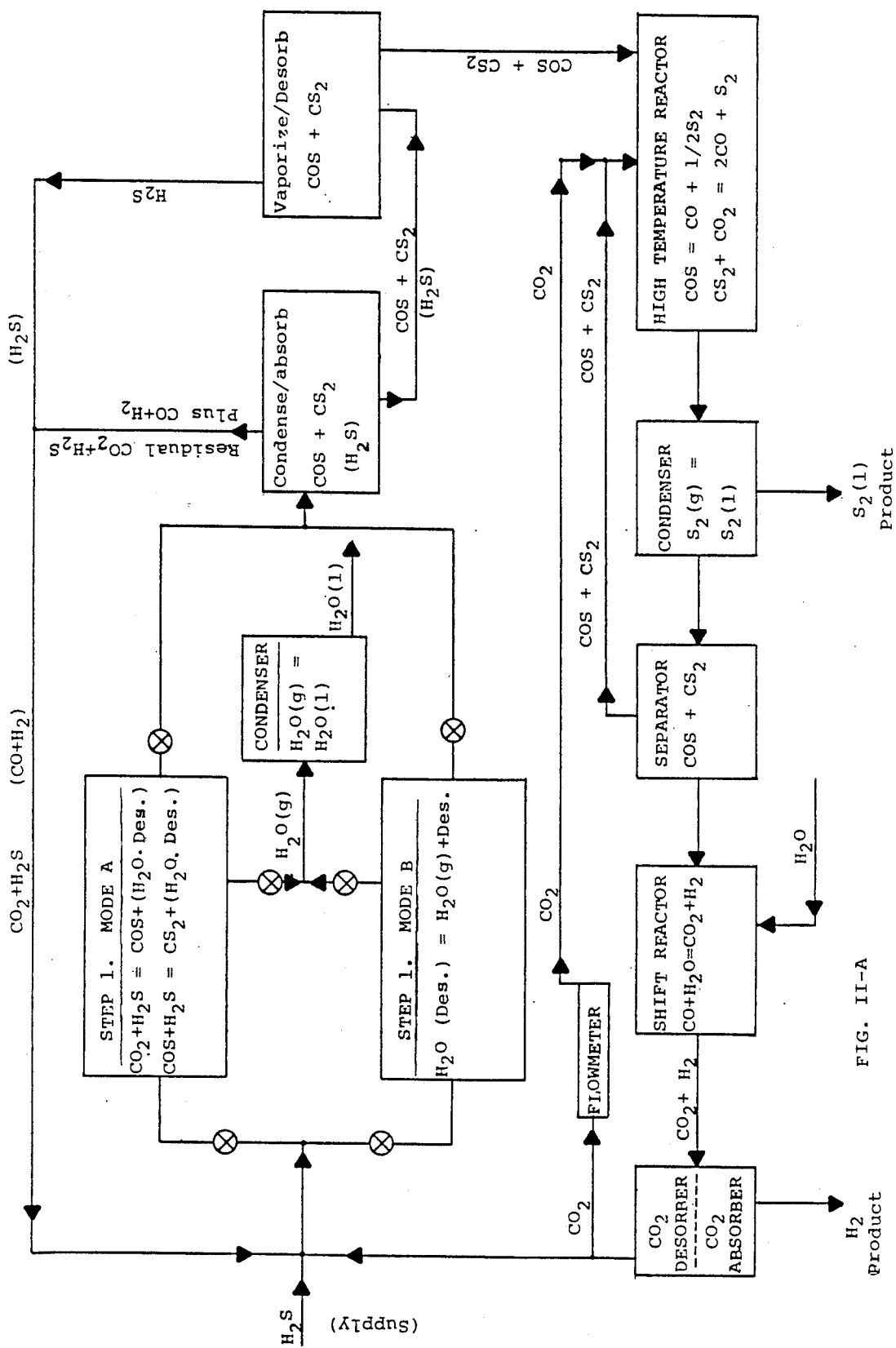
FIG. II-A

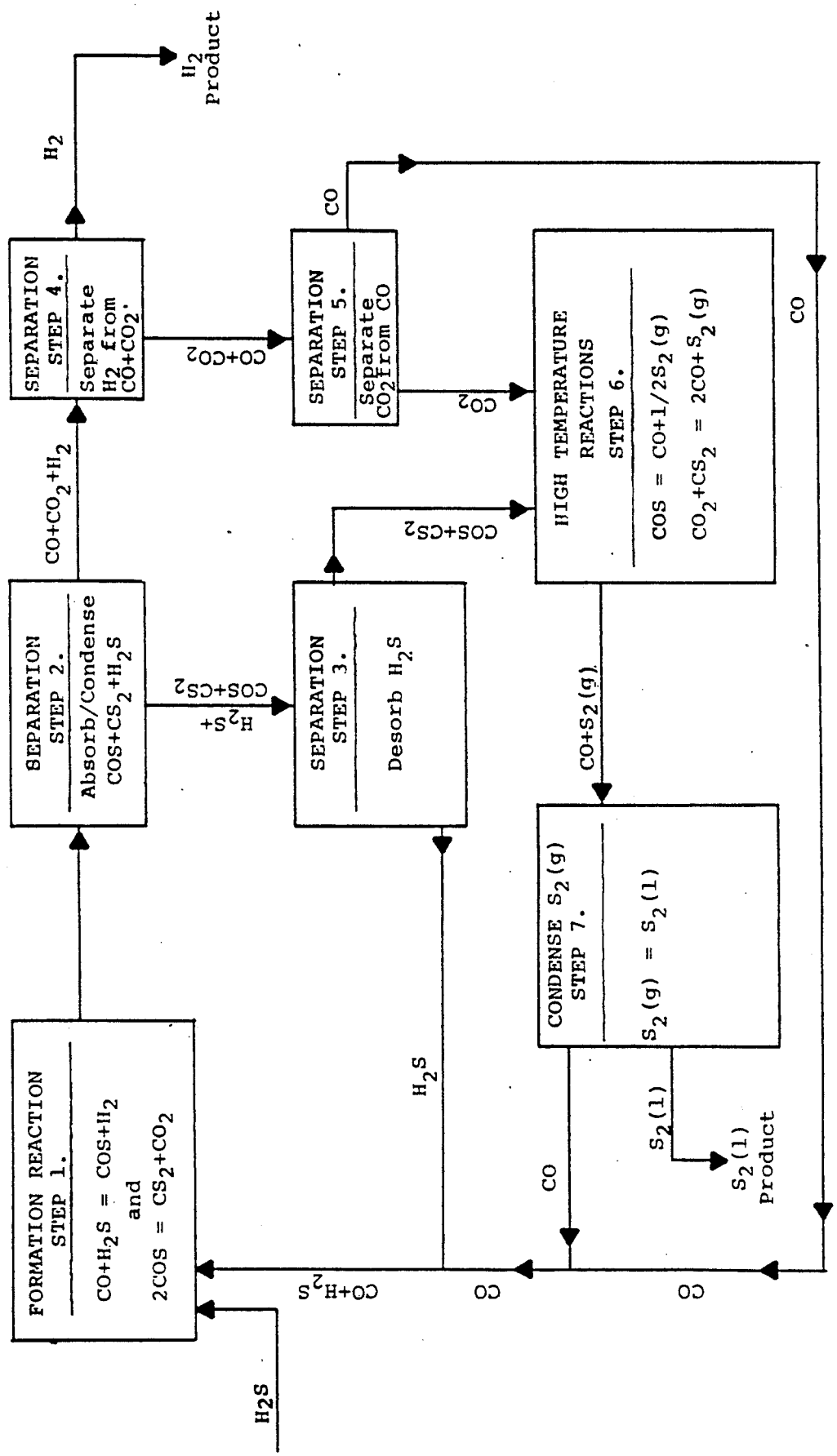
FIG. III-A

THERMOCHEMICAL CYCLE FOR SPLITTING HYDROGEN SULFIDE

BACKGROUND OF THE INVENTION

1. Field:

The field of the invention is methods for recovery of hydrogen and sulfur by breakdown of gaseous hydrogen sulfide ($H_2S$)

2. State of the Art:

Over a period of several decades, many chemical process workers have studied methods for the decomposition of hydrogen sulfide to yield hydrogen and elemental sulfur. The reason for these efforts has been the very large quantities of hydrogen and elemental sulfur contained in the noxious hydrogen sulfide, $H_2S$, produced in the refining of petroleum and the purifying of natural gas. At present, $H_2S$ is partially oxidized to produce sulfur dioxide ($SO_2$), which reacts with residual $H_2S$ to form elemental sulfur and water. This method is known as the Claus process. Kalina and Maas[5] noted that, in 1982, conversion of hydrogen sulfide by this method yielded $4.2 \times 10^6$ long tons of sulfur, approximately 50% of the sulfur produced in the United States that year. Also noted was the fact that recovery of the stoichiometric amount of hydrogen associated with this sulfur could, if recovered, provide a very significant portion of the hydrogen required for heavy crude oil upgrading, and for coal liquefying and gasifying.

The following $H_2S$ decomposition methods have been studied and described in recent papers:

direct, high temperature thermal decomposition, with separation of the resultant gases by means of pressure swing absorption of $H_2S$[1];

direct high temperature thermal decomposition, with high temperature separation of gases by means of porous ceramic membranes[6];

thermochemical cycles involving the reaction of $H_2S$ with a metal or metal sulfide to form a higher sulfide and evolve hydrogen, followed by thermal decomposition of the higher sulfide[8];

electrochemical processes for $H_2S$ decomposition[4,5]; and photolytic decomposition of $H_2S$ via the irradiation of semiconductor electrodes or treated particles with light[2].

All of these methods, with the possible exception of the photon based processes, appear to offer possibilities for development of practical approaches for recovery of both $S_2$ and $H_2$. However, none have been developed sufficiently nor widely adopted by the petroleum industry, which remains in need of a practical, economical method.

REFERENCES

1. Bandermann, F. and K.-B. Harder. Production of $H_2$ Via Thermal Decomposition of $H_2S$ and Separation of $H_2$ and $H_2S$ by Pressure Swing Adsorption. *Int. J. Hydrogen Energy*. Vol. 7, No. 6, pp. 471–475, 1982.
2. Barbeni, M., E. Pelizzetti, E. Borgarello, N. Serpone, M. Gratzel L. Balducci and M. Visca. Hydrogen From Hydrogen Sulfide Cleavage. Improved Efficiency Via Modification of Semiconductor Particulates. *Int. J. Hydrogen Energy*, Vol. 10, No. 4, pp. 249–253, 1985.
3. Chivers, T. and C. Lau. The Thermal Decomposition of Hydrogen sulfide Over Alkali Metal Sulfides and Polysulfides. *Int. J. Hydrogen Energy*, Vol. 10. No. 1, pp. 21–25. 1985.
4. Kalina, D. W. and E. T. Maas, Jr. (1985-1). Indirect Hydrogen Sulfide Conversion—1. An Acidic Electrochemical Process. *Int. J. Hydrogen Energy*, Vol. 10. No. 3, pp. 157–162, 1985.
5. Kalina, D. W. and E. T. Maas, Jr. (1985-2). Indirect Hydrogen Sulfide Conversion—II. A Basic Electrochemical Process. *Int. J. Hydrogen Energy*, Vol. 10, No. 3, pp. 163–167, 1985.
6. Kameyama, T., M. Dokiya, M. Fujishige, H. Yokokawa and K. Fukuda. Possibility For Effect Production of Hydrogen From Hydrogen Sulfide by Means of a Porous Vycor Glass Membrane. *Ind. Eng. Chem. Fund.*, 20, pp. 97, 1981
7. Kameyama, T., M. Dokiya, M. Fujishige, H. Yokogawa and K. Fukuda. Production of Hydrogen From Hydrogen sulfide by Porous Ceramic Membrane. *Kagikenpou*, 77, pp. 627, 1982.
8. Kiuchi, H., T. Nakamura, K. Funaki and T. Tanaka. Recovery of Hydrogen From Hydrogen Sulfide With Metals of Metal Sulfides. *Int. J. Hydrogen Energy*, Vol. 7, No. 6, pp. 477–482, 1982.
9. Naman, S. A., S. M. Aliwi and K. Al-Emara. Hydrogen Production From Splitting H S By Visible Light Irradiation of Vanadium Sulfides Dispersion Loaded With $RuO_2$. *Int. J. Hydrogen Energy*, Vol. 11, No. 1, pp. 33–38, 1986.
10. Terres, E. and H. Wesemann. *Angew. Chem.* 45, pp. 795–803, 1932.
11. Fukudu, et al, J. of Catalysis, 49, 379 (1977); Bul. of Chemistry for Japan, 51, 150 (1973); U.S. Pat. No. 3,856,925.

BRIEF SUMMARY OF THE INVENTION

With the foregoing in mind, the present invention eliminates or substantially alleviates the disadvantages of prior art methods of splitting $H_2S$, by providing a thermochemical process based on selected initial reactions of $H_2S$ with carbon dioxide ($CO_2$) or carbon monoxide (CO). The invention may be carried out by use of any one of three variations of the basic process, each characterized by use of individually selected starting (reactor inlet) gas compositions, reaction pressures, and reaction sequences. Two of the process variations utilize the well known water gas shift reaction to yield hydrogen ($H_2$) after production of sulfur ($S_2$) by the initial $CO_2$ reaction described above. The third evolves $H_2$ in the initial CO reaction, described above. The sulfur is obtained by subsequent thermal decomposition of carbonyl sulfide (COS) and carbon disulfide ($CS_2$), which are products of the initial reactions. Each of the three processes also incorporates separation steps for the recovery of the $H_2$ and $S_2$, as well as necessary intermediate separation measures. Each process may be conducted at temperatures and pressures selected over a considerable range, as necessary for desirable results with individual process equipment variables, such as size and temperature capability.

It is therefore the object of the present invention to provide a process for complete recovery of hydrogen and sulfur by splitting of hydrogen sulfide.

BRIEF DESCRIPTION OF THE DRAWINGS

In the drawings, which represent the best modes presently contemplated for carrying out the invention, FIG. I-B graphically illustrates the variation in the proportions of carbon dioxide and hydrogen after the shift reaction, and the variation in the hydrogen sulfide+carbonyl sulfide fractions per mole of hydrogen, as functions of reaction temperatures, FIG. 1-C graphically illustrates the variation in the proportions of carbon dioxide and hydrogen after the shift reaction, and the variation in the proportions of the hydrogen sulfide+carbonyl sulfide fraction and hydrogen, as a function of the proportion of carbon dioxide and hydrogen sulfide in the inlet gases, FIG. I-D graphically indicates the variations in the proportions of carbon dioxide and hydrogen after the shift reaction, and the variations in the proportions of the hydrogen sulfide+carbonyl sulfide fraction and hydrogen, as a function of reaction pressures, FIG. 1-A is a flow diagram of Version I of the thermochemical cycle of the invention, FIG. 2-A is a flow diagram of Version II of the thermochemical cycle of the invention, and FIG. 3-A is a flow diagram of Version III of the thermochemical cycle of the invention.

DETAILED DESCRIPTION OF PROCESS VERSIONS

Three versions of a new thermochemical cycle are described, each for recovery of hydrogen and elemental sulfur by splitting of hydrogen sulfide. The versions vary, in that each is based on individually selected temperatures and mixtures of inlet gases for its initial process reactions. The versions are herein designated Versions I, II and III. The high temperature step in Version I involves the reaction of $CO_2$ with $H_2S$, the high temperature enhancing the direct formation of CO for subsequent reaction with water for hydrogen formation. High temperature is utilized in Versons II and III for decomposition of carbonyl sulfide (COS) to form gaseous CO and sulfur, $S_2(g)$, for sulfur recovery. In Versions II and III, mixtures of COS and $CS_2$ may also be decomposed by the application of high temperatures to again form $CO + S_2(g)$.

Equilibrium products of the $CO_2$, CO, $H_2S$ reactions produce mixtures of several gaseous species. Various reactions which occur to define the final gas composition include:

$$CO_2 + H_2S = COS + H_2O$$

$$COS = CO + 0.5S_2(g)$$

$$COS + H_2S = CS_2 + H_2O$$

$$CO + H_2O = CO_2 + H_2$$

$$CO + H_2S = COS + H_2$$

$$CO_2 + 0.75S_2 = COS + 0.5SO_2$$

$$CO_2 + CS_2 = 2COS$$

At equilibrium, the different reactant species exist in a range of concentrations, depending on reaction pressure, temperature and composition of the initial reactant inlet gases.

VERSION I

Version I is the first preferred variation of the new $H_2S$ splitting methods, and is based on the reaction of $H_2S$ with $CO_2$ at the highest practical temperatures, in order to enhance the direct yield of CO without intermediate formation of COS. Version I includes the following steps, which are illustrated in a flow diagram in FIG. I-A.

1. The high temperature reaction of $H_2S$ with $CO_2$:

$$CO_2 + H_2S = CO + H_2O = 0.5S_2 \qquad (I\text{-}1)$$

2. Separation of $S_2(G)$ by condensation.
3. Separation of $H_2O(g)$ by condensation.
4. Separation of $CO_2 + CO + H_2$ fraction (after reaction I-1) from the residual $H_2S + COS + CS_2$ fraction. (The $CS_2$ is almost negligible). This is the primary separation step of Version I. It can probably best be effected by dissolving the sulfur bearing species in a solvent in which CO and $CO_2$ are not soluble, such as liquid $CS_2$. The separated $H_2S + COS + CS_2$ is mixed with $CO_2$ from step 6 and additional $H_2S$ to constitute the inlet gas for a repetition of the cycle.
5. Formation of $H_2$ by reaction of $CO + H_2O$:

$$CO + H_2O = CO_2 + H_2 \qquad (I\text{-}2)$$

This reaction is commonly called the water-gas shift reaction.

6. Separation of the $H_2$ from $CO_2$ by methods now used commercially for the water-gas shift process, such as condensation/evaporation and absorption/desorption.

As stated above, compositions of the product gases will vary with pressure, temperature, and composition of the inlet gases. Equilibrium compositions computed for a variety of pressures, temperatures and inlet gas compositions are presented in I-A through I-D below. Computations were based where possible on data listed in the Joint Army Navy Air Force (JANAF) Thermochemical Tables. For COS, experimental data was used from studies by Terres and Wesemann (1932)[10].

TABLE I-A

| T | % CO2 | % H2S | % COS | % H2O | % CO | % CS2 | % H2 | % S2 | CO2*/H2* | H2S/H2* | COS/H2* |
|---|---|---|---|---|---|---|---|---|---|---|---|
| Inlet: 0.67 atm. CO2, 0.33 atm. H2S. | | | | | | | | | | | |
| 900 | 59.68 | 26.34 | 3.72 | 5.96 | 2.14 | 0.05 | 0.49 | 1.31 | 23.52 | 10.14 | 1.42 |
| 1000 | 56.10 | 23.57 | 3.54 | 8.29 | 4.65 | 0.05 | 0.99 | 2.82 | 10.77 | 4.18 | 0.63 |
| 1100 | 51.65 | 19.74 | 2.97 | 11.05 | 8.00 | 0.04 | 1.70 | 4.85 | 6.15 | 2.04 | 0.31 |
| 1200 | 46.92 | 15.57 | 2.30 | 13.97 | 11.61 | 0.03 | 2.53 | 7.07 | 4.14 | 1.10 | 0.16 |
| 1300 | 42.54 | 11.65 | 1.69 | 16.67 | 14.95 | 0.02 | 3.35 | 9.15 | 3.14 | 0.64 | 0.09 |
| Inlet: 0.6 atm. CO2, 0.4 atm. H2S. | | | | | | | | | | | |
| 900 | 52.74 | 32.92 | 3.90 | 6.21 | 2.18 | 0.07 | 0.59 | 1.39 | 19.81 | 11.87 | 1.41 |
| 1000 | 49.03 | 29.58 | 3.73 | 8.63 | 4.77 | 0.07 | 1.21 | 2.99 | 9.00 | 4.95 | 0.62 |
| 1100 | 44.43 | 25.35 | 3.16 | 11.49 | 8.23 | 0.05 | 2.12 | 5.17 | 5.09 | 2.45 | 0.31 |
| 1200 | 39.50 | 20.63 | 2.47 | 14.53 | 12.00 | 0.04 | 3.23 | 7.62 | 3.38 | 1.35 | 0.16 |

TABLE I-A-continued

| T | % CO2 | % H2S | % COS | % H2O | % CO | % CS2 | % H2 | % S2 | CO2*/H2* | H2S/H2* | COS/H2* |
|---|---|---|---|---|---|---|---|---|---|---|---|
| 1300 | 34.89 | 16.01 | 1.83 | 17.38 | 15.50 | 0.02 | 4.41 | 9.97 | 2.53 | 0.80 | 0.09 |
| Inlet: 0.5 atm. CO2, 0.5 atm. H2S. | | | | | | | | | | | |
| 900 | 42.63 | 42.57 | 4.00 | 6.34 | 2.17 | 0.09 | 0.75 | 1.46 | 15.33 | 14.57 | 1.37 |
| 1000 | 38.91 | 38.94 | 3.83 | 8.77 | 4.76 | 0.09 | 1.55 | 3.16 | 6.92 | 6.17 | 0.61 |
| 1100 | 34.31 | 34.24 | 3.26 | 11.63 | 8.23 | 0.07 | 2.77 | 5.50 | 3.87 | 3.11 | 0.30 |
| 1200 | 29.42 | 28.84 | 2.55 | 14.63 | 11.98 | 0.05 | 4.37 | 8.17 | 2.53 | 1.76 | 0.16 |
| 1300 | 24.89 | 23.35 | 1.90 | 17.41 | 15.44 | 0.03 | 6.17 | 10.81 | 1.87 | 1.08 | 0.09 |
| Inlet: 0.4 atm. CO2, 0.6 atm. H2S. | | | | | | | | | | | |
| 900 | 32.84 | 52.48 | 3.89 | 6.19 | 2.09 | 0.11 | 0.91 | 1.50 | 11.65 | 17.51 | 1.30 |
| 1000 | 29.29 | 48.67 | 3.72 | 8.54 | 4.57 | 0.11 | 1.91 | 3.24 | 5.23 | 7.52 | 0.57 |
| 1100 | 24.98 | 43.65 | 3.15 | 11.17 | 7.84 | 0.09 | 3.48 | 5.66 | 2.90 | 3.86 | 0.28 |
| 1200 | 20.51 | 37.72 | 2.45 | 13.89 | 11.30 | 0.07 | 5.61 | 8.46 | 1.88 | 2.23 | 0.14 |
| 1300 | 16.50 | 31.48 | 1.81 | 16.32 | 14.42 | 0.05 | 8.15 | 11.28 | 1.37 | 1.39 | 0.08 |

CO2* and H2* refer to quantities after the shift reaction.

TABLE I-B

| T | % CO2 | % H2S | % COS | % H2O | % CO | % CS2 | % H2 | % S2 | CO2*/H2* | H2S/H2* | COS/H2* |
|---|---|---|---|---|---|---|---|---|---|---|---|
| Inlet: 2 atm. CO2, 1 atm. H2S. | | | | | | | | | | | |
| 900 | 60.23 | 27.15 | 4.01 | 5.69 | 1.56 | 0.06 | 0.34 | 0.95 | 32.49 | 14.27 | 2.11 |
| 1000 | 57.22 | 24.60 | 4.05 | 7.72 | 3.54 | 0.07 | 0.69 | 2.12 | 14.35 | 5.81 | 0.96 |
| 1100 | 53.38 | 21.41 | 3.63 | 10.13 | 6.39 | 0.06 | 1.20 | 3.80 | 7.87 | 2.82 | 0.48 |
| 1200 | 49.07 | 17.79 | 3.00 | 12.78 | 9.69 | 0.04 | 1.85 | 5.77 | 5.09 | 1.54 | 0.26 |
| 1300 | 44.81 | 14.14 | 2.34 | 15.38 | 12.98 | 0.03 | 2.55 | 7.76 | 3.72 | 0.91 | 0.15 |
| Inlet: 1.8 atm. CO2, 1.2 atm. H2S. | | | | | | | | | | | |
| 900 | 53.32 | 33.47 | 4.20 | 5.94 | 1.59 | 0.08 | 0.41 | 1.00 | 27.43 | 16.72 | 2.10 |
| 1000 | 50.20 | 30.73 | 4.25 | 8.05 | 3.63 | 0.08 | 0.84 | 2.23 | 12.05 | 6.88 | 0.95 |
| 1100 | 46.22 | 27.24 | 3.84 | 10.55 | 6.56 | 0.07 | 1.49 | 4.02 | 6.56 | 3.39 | 0.48 |
| 1200 | 41.74 | 23.21 | 3.20 | 13.31 | 9.99 | 0.06 | 2.33 | 6.16 | 4.20 | 1.88 | 0.26 |
| 1300 | 37.28 | 19.03 | 2.52 | 16.03 | 13.43 | 0.04 | 3.30 | 8.37 | 3.03 | 1.14 | 0.15 |
| Inlet: 1.5 atm. CO2, 1.5 atm. H2S. | | | | | | | | | | | |
| 900 | 43.20 | 43.19 | 4.29 | 6.07 | 1.59 | 0.10 | 0.52 | 1.05 | 21.29 | 20.53 | 2.04 |
| 1000 | 40.06 | 40.23 | 4.36 | 8.20 | 3.63 | 0.11 | 1.07 | 2.35 | 9.30 | 8.57 | 0.93 |
| 1100 | 36.07 | 36.42 | 3.95 | 10.71 | 6.56 | 0.10 | 1.94 | 4.25 | 5.02 | 4.29 | 0.46 |
| 1200 | 31.61 | 31.91 | 3.30 | 13.44 | 9.99 | 0.08 | 3.11 | 6.55 | 3.18 | 2.44 | 0.25 |
| 1300 | 27.21 | 27.09 | 2.60 | 16.12 | 13.41 | 0.06 | 4.54 | 8.97 | 2.26 | 1.51 | 0.15 |
| Inlet: 1.2 atm. CO2, 1.8 atm. H2S. | | | | | | | | | | | |
| 900 | 33.38 | 53.16 | 4.17 | 5.94 | 1.53 | 0.12 | 0.63 | 1.08 | 16.20 | 24.68 | 1.94 |
| 1000 | 30.37 | 50.09 | 4.23 | 7.98 | 3.48 | 0.14 | 1.32 | 2.40 | 7.05 | 10.44 | 0.88 |
| 1100 | 26.61 | 46.07 | 3.82 | 10.34 | 6.27 | 0.13 | 2.42 | 4.35 | 3.78 | 5.30 | 0.44 |
| 1200 | 22.48 | 41.23 | 3.17 | 12.85 | 9.48 | 0.10 | 3.97 | 6.72 | 2.38 | 3.07 | 0.24 |
| 1300 | 18.52 | 35.91 | 2.48 | 15.23 | 12.60 | 0.08 | 5.92 | 9.26 | 1.68 | 1.94 | 0.13 |

CO2* and H2* refer to quantities after the shift reaction.

TABLE I-C

| T | % CO2 | % H2S | % COS | % H2O | % CO | % CS2 | % H2 | % S2 | CO2*/H2* | H2S/H2* | COS/H2* |
|---|---|---|---|---|---|---|---|---|---|---|---|
| Inlet: 4 atm. CO2, 2 atm. H2S. | | | | | | | | | | | |
| 900 | 60.01 | 27.39 | 4.16 | 5.56 | 1.27 | 0.07 | 0.27 | 0.77 | 39.74 | 17.76 | 2.70 |
| 1000 | 57.81 | 25.11 | 4.33 | 7.43 | 2.95 | 0.07 | 0.55 | 1.75 | 17.36 | 7.17 | 1.24 |
| 1100 | 54.34 | 22.27 | 4.04 | 9.64 | 5.46 | 0.07 | 0.96 | 3.21 | 9.31 | 3.47 | 0.63 |
| 1200 | 50.35 | 19.00 | 3.48 | 12.10 | 8.51 | 0.06 | 1.50 | 5.01 | 5.88 | 1.90 | 0.35 |
| 1300 | 46.25 | 15.60 | 2.82 | 14.59 | 11.69 | 0.04 | 2.11 | 6.90 | 4.20 | 1.13 | 0.20 |
| Inlet: 3.6 atm. CO2, 2.4 atm. H2S. | | | | | | | | | | | |
| 900 | 53.60 | 33.73 | 4.35 | 5.81 | 1.30 | 0.08 | 0.33 | 0.81 | 33.85 | 20.80 | 2.68 |
| 1000 | 50.80 | 31.28 | 4.55 | 7.75 | 3.02 | 0.09 | 0.67 | 1.84 | 14.61 | 8.49 | 1.23 |
| 1100 | 47.21 | 28.20 | 4.27 | 10.05 | 5.61 | 0.09 | 1.19 | 3.40 | 7.78 | 4.15 | 0.63 |
| 1200 | 43.06 | 24.60 | 3.69 | 12.61 | 8.77 | 0.07 | 1.88 | 5.33 | 4.87 | 2.31 | 0.35 |
| 1300 | 38.79 | 20.75 | 3.01 | 15.20 | 12.09 | 0.05 | 2.71 | 7.40 | 3.44 | 1.40 | 0.20 |
| Inlet: 3 atm. CO2, 3 atm. H2S. | | | | | | | | | | | |
| 900 | 43.48 | 43.48 | 4.44 | 5.94 | 1.29 | 0.11 | 0.41 | 0.85 | 26.31 | 25.55 | 2.61 |
| 1000 | 40.66 | 40.05 | 4.65 | 7.92 | 3.02 | 0.12 | 0.85 | 1.93 | 11.30 | 10.36 | 1.20 |
| 1100 | 37.05 | 37.51 | 4.38 | 10.22 | 5.60 | 0.12 | 1.54 | 3.57 | 5.98 | 5.26 | 0.61 |
| 1200 | 32.91 | 33.52 | 3.80 | 12.77 | 8.77 | 0.10 | 2.49 | 5.63 | 3.70 | 2.98 | 0.34 |
| 1300 | 28.69 | 29.17 | 3.11 | 15.33 | 12.07 | 0.08 | 3.69 | 7.88 | 2.59 | 1.85 | 0.20 |
| Inlet: 2.4 atm. CO2, 3.6 atm. H2S. | | | | | | | | | | | |
| 900 | 33.65 | 53.48 | 4.32 | 5.82 | 1.24 | 0.13 | 0.50 | 0.87 | 20.05 | 30.74 | 2.48 |
| 1000 | 30.94 | 50.77 | 4.52 | 7.72 | 2.90 | 0.15 | 1.04 | 1.97 | 8.58 | 12.88 | 1.15 |
| 1100 | 27.52 | 47.27 | 4.23 | 9.90 | 5.37 | 0.15 | 1.92 | 3.64 | 4.51 | 6.49 | 0.58 |
| 1200 | 23.66 | 43.04 | 3.65 | 12.25 | 8.35 | 0.13 | 3.17 | 5.76 | 2.78 | 3.74 | 0.32 |

TABLE I-C-continued

| T | % CO2 | % H2S | % COS | % H2O | % CO | % CS2 | % H2 | % S2 | CO2*/H2* | H2S/H2* | COS/H2* |
|---|-------|-------|-------|-------|------|-------|------|------|----------|---------|---------|
| 1300 | 19.82 | 38.31 | 2.97 | 14.56 | 11.39 | 0.10 | 4.78 | 8.08 | 1.93 | 2.37 | 0.18 |

CO2* and H2* refer to quantities after the shift reaction.

TABLE I-D

| T | % CO2 | % H2S | % COS | % H2O | % CO | % CS2 | % H2 | % S2 | CO2*/H2* | H2S/H2* | COS/H2* |
|---|-------|-------|-------|-------|------|-------|------|------|----------|---------|---------|
| Inlet: 8 atm. CO2, 4 atm. H2S. | | | | | | | | | | | |
| 900 | 60.74 | 27.58 | 4.34 | 5.38 | 1.04 | 0.07 | 0.21 | 0.63 | 49.27 | 21.99 | 3.46 |
| 1000 | 58.30 | 25.52 | 4.65 | 7.11 | 2.46 | 0.09 | 0.43 | 1.45 | 21.00 | 8.82 | 1.61 |
| 1100 | 55.18 | 23.00 | 4.48 | 9.13 | 4.66 | 0.08 | 0.77 | 2.71 | 11.04 | 4.24 | 0.83 |
| 1200 | 51.52 | 20.07 | 3.98 | 11.41 | 7.43 | 0.07 | 1.21 | 4.32 | 6.83 | 2.32 | 0.46 |
| 1300 | 47.66 | 16.94 | 3.34 | 13.77 | 10.44 | 0.05 | 1.72 | 6.08 | 4.78 | 1.39 | 0.27 |
| Inlet: 7.2 atm. CO2, 4.8 atm. H2S. | | | | | | | | | | | |
| 900 | 53.83 | 33.95 | 4.55 | 5.61 | 1.06 | 0.09 | 0.26 | 0.66 | 41.62 | 25.74 | 3.45 |
| 1000 | 51.30 | 31.74 | 4.88 | 7.40 | 2.52 | 0.11 | 0.52 | 1.52 | 17.68 | 10.42 | 1.60 |
| 1100 | 48.07 | 29.01 | 4.72 | 9.51 | 4.78 | 0.11 | 0.94 | 2.86 | 9.24 | 5.07 | 0.82 |
| 1200 | 44.26 | 25.80 | 4.23 | 11.88 | 7.65 | 0.09 | 1.51 | 4.58 | 5.67 | 2.82 | 0.46 |
| 1300 | 40.24 | 22.31 | 3.56 | 14.35 | 10.78 | 0.07 | 2.20 | 6.49 | 3.93 | 1.72 | 0.27 |
| Inlet: 6 atm. CO2, 6 atm. H2S. | | | | | | | | | | | |
| 900 | 43.71 | 43.72 | 4.66 | 5.72 | 1.06 | 0.12 | 0.32 | 0.69 | 32.32 | 31.56 | 3.36 |
| 1000 | 41.15 | 41.37 | 5.01 | 7.54 | 2.53 | 0.14 | 0.67 | 1.60 | 13.68 | 12.95 | 1.57 |
| 1100 | 37.90 | 38.43 | 4.86 | 9.66 | 4.80 | 0.14 | 1.21 | 3.01 | 7.10 | 6.39 | 0.81 |
| 1200 | 34.10 | 34.92 | 4.35 | 12.03 | 7.68 | 0.13 | 1.98 | 4.83 | 4.32 | 3.61 | 0.45 |
| 1300 | 30.10 | 31.03 | 3.67 | 14.47 | 10.80 | 0.10 | 2.97 | 6.88 | 2.97 | 2.25 | 0.27 |
| Inlet: 4.8 atm. CO2, 7.2 atm. H2S. | | | | | | | | | | | |
| 900 | 33.86 | 53.74 | 4.55 | 5.58 | 1.03 | 0.14 | 0.39 | 0.71 | 24.60 | 37.90 | 3.21 |
| 1000 | 31.40 | 51.33 | 4.88 | 7.32 | 2.44 | 0.17 | 0.82 | 1.63 | 10.38 | 15.75 | 1.50 |
| 1100 | 28.30 | 48.28 | 4.72 | 9.33 | 4.61 | 0.18 | 1.51 | 3.06 | 5.37 | 7.88 | 0.77 |
| 1200 | 24.74 | 44.59 | 4.20 | 11.54 | 7.34 | 0.16 | 2.51 | 4.92 | 3.26 | 4.53 | 0.43 |
| 1300 | 21.07 | 40.41 | 3.52 | 13.76 | 10.24 | 0.13 | 3.82 | 7.03 | 2.23 | 2.87 | 0.25 |

CO2* and H2* refer to quantities after the shift reaction.

Equilibrium constants were measured for the $CO_2 + H_2S$: reaction over the temperature range of 623°–873° K. The experimental success of these early studies, made to determine thermochemical parameters, confirms the practicality of the basic reactions of the present invention, given proper conditions.

The calculations for Tables I-A, I-B, I-C and I-D are based on the assumption that the inlet gas is composed of only $CO_2$ and $H_2S$. However, in practice, steady state concentrations of COS and $CS_2$ would be recycled from step 4, resulting in a small net increase in the calculated CO yields. At equilibrium, very small amounts of $SO_2$ would also be formed, not listed in the tables being less than 0.1%. As stated in footnotes to the tables, $CO_2^*$ and $H_2^*$ refer to the quantities in the system that exist *after* the shift reaction. Thus, the ratio $CO_2^*/H_2^*$ is the number of moles of $CO_2$ to be separated from $H_2$ after the shift reaction step per mole of $H_2$ produced in the overall process. The ratios $H_2S/H_2^*$ and $COS/H_2^*$ are the moles of each of these gases to be separated from the $CO_2 + CO + H_2$ fraction, *after* reaction (I-1), per mole of $H_2$ product.

It is desirable to minimize the quantities of gases that must be separated by condensation/evaporation or by absorption/desorption. From the tables, it is apparent that several variables can be adjusted to optimize the overall process.

1. The number of moles of the different process gases to be separated and recirculated, per mole of $H_2$ produced, decreases quite rapidly with increasing temperature. A practical process can probably operate at temperatures below 1300° K. However, the higher relative yield of $H_2$ with an increase in temperature may well justify the use of expensive materials that can be used at even higher temperatures.

2. The $CO_2/H_2S$ ratio in the inlet gas can be adjusted to minimize the overall problem of the separation of gases. For example, at 1300° K. and an operating pressure of 3 atm., the $CO_2^*/H_2^*$ ratio decreases from 3.72 with 66.7% $CO_2$ in the inlet gas to 1.68 with 40% $CO_2$ in the inlet gas. The $(H_2S + COS)H_2^*$ ratio *increases* from 1.06 to 2.07 over the same composition range.

3. The relative yield of $H_2$ decreases with increased operating pressure. For example, at a temperature of 1300° K. and equimolar $CO_2$–$H_2S$ at the inlet, the $CO_2^*/H_2^*$ ratio increases from 1.87 for a pressure of 1 atm. to 2.97 for a pressure of 12 atm. The $(H_2S + COS)/_{H_2}^*$ ratio increases from 1.17 to 2.52 over the same pressure range. The relative amount of the $H_2S + COS$ fraction increases somewhat with increasing pressure. It is emphasized, however, that several advantages accrue to operating a practical system at high pressure. Costs per unit output are lowered for heat exchangers, and pressures of the product gases will probably more nearly approximate the pressure at which they will subsequently be used. The higher pressures also simplify gas separation.

The effects of temperature, composition of inlet gases and pressure are illustrated in FIGS. I-B, I-C and I-D. At 1200° K., reaction (I-1) is endothermic by about 29.5 kcal. However, some $H_2$ is formed simultaneously in reaction (I-2) which is exothermic by about 7.9 kcal. At a temperature of 1200° K., 50% $CO_2$ in the inlet gas and a pressure of 3 atm., reaction (I-2) would be about 25% complete. Thus, the overall heat requirement for the two reactions would be about 27.5 kcal. Condensation of 0.5 mole of $S_2$ at about 700° K. would yield 13.4 kcal. of high quality heat. Heat from the condensation of 0.75 mole of $H_2O$ might be useful for some low temperature applications.

VERSION II

In Version II, the initial reaction of $CO_2$ with $H_2S$ is conducted at intermediate temperatures. A suitable desicant is used to reduce pressures of $H_2O$ to shift reaction equilibria to maximize the yields of COS and $CS_2$. The important reactions are:

$$CO_2 + H_2S = COS + H_2O \tag{II-1}$$

$$COS + H_2S = CS_2 + H_2O \tag{II-2}$$

The following reaction also controls relative amounts of $CO_2$, COS and $CS_2$.

$$CO_2 + CS_2 = 2COS \tag{II-3}$$

Relatively small amounts of CO, $S_2$ and $H_2$ are also produced. Computed equilibrium product compositions over a temperature range of 600°–900° K. for various pressures, compositions of inlet gas and assumed $H_2O$ pressures are presented in Tables II-A to II-F below. Practical pressures must be selected during set up of the process, a wide range of $H_2O$ pressures having been used in the claculations. Many of the well characterized desiccants are effective only at temperatures below those required for practical yields in reactions II-1 and II-2. The listed $H_2$ pressures represent equilibria for the given CO, $CO_2$ and $H_2O$ pressures. Recirculation of steady state compositions of CO and $H_2$ is probably desirable in the operating process. This would suppress both COS decomposition into CO and $S_2$ and hydrogen formation during successive cycles. Slightly enhanced yields of COS and $CS_2$ would result.

TABLE II-A (PH2O = 0.01 atm)
(YLD = COS + 2CS2)

| T | % CO2 | % H2S | % COS | % H2O | % CO | % CS2 | % H2 | % S2 | YLD/CO2 | COS/H2S | YLD/H2S |
|---|-------|-------|-------|-------|------|-------|------|------|---------|---------|---------|
| Inlet: 2 atm. CO2, 1 atm. H2S. | | | | | | | | | | | |
| 600 | 62.23 | 28.95 | 7.51 | 0.33 | 0.44 | 0.21 | 0.07 | 0.26 | 0.13 | 0.26 | 0.27 |
| 700 | 57.06 | 24.01 | 15.33 | 0.33 | 1.46 | 0.95 | 0.08 | 0.77 | 0.30 | 0.64 | 0.72 |
| 800 | 52.14 | 18.89 | 23.26 | 0.33 | 1.93 | 2.40 | 0.05 | 0.99 | 0.54 | 1.23 | 1.49 |
| 900 | 45.84 | 14.08 | 27.04 | 0.33 | 5.92 | 3.68 | 0.10 | 3.01 | 0.75 | 1.92 | 2.44 |
| Inlet: 1.5 atm. CO2, 1.5 atm. H2S. | | | | | | | | | | | |
| 600 | 45.02 | 44.98 | 8.44 | 0.33 | 0.47 | 0.36 | 0.10 | 0.29 | 0.20 | 0.19 | 0.20 |
| 700 | 39.17 | 39.16 | 17.17 | 0.33 | 1.50 | 1.73 | 0.12 | 0.81 | 0.53 | 0.44 | 0.53 |
| 800 | 33.36 | 32.72 | 25.77 | 0.33 | 2.05 | 4.60 | 0.09 | 1.07 | 1.05 | 0.79 | 1.07 |
| 900 | 26.35 | 26.67 | 29.43 | 0.33 | 6.24 | 7.58 | 0.18 | 3.21 | 1.69 | 1.10 | 1.67 |
| Inlet: 1 atm. CO2, 2 atm. H2S. | | | | | | | | | | | |
| 600 | 28.86 | 62.05 | 7.47 | 0.33 | 0.42 | 0.45 | 0.14 | 0.28 | 0.29 | 0.12 | 0.13 |
| 700 | 23.57 | 56.60 | 14.93 | 0.33 | 1.40 | 2.18 | 0.19 | 0.79 | 0.82 | 0.26 | 0.34 |
| 800 | 18.39 | 50.41 | 21.89 | 0.33 | 1.82 | 6.03 | 0.14 | 0.98 | 1.85 | 0.43 | 0.67 |
| 900 | 12.62 | 44.72 | 23.63 | 0.33 | 5.33 | 10.21 | 0.33 | 2.83 | 3.49 | 0.53 | 0.99 |
| Inlet: 4 atm. CO2, 2 atm. H2S. | | | | | | | | | | | |
| 600 | 59.40 | 26.05 | 12.90 | 0.17 | 0.52 | 0.65 | 0.04 | 0.28 | 0.24 | 0.50 | 0.55 |
| 700 | 52.82 | 19.41 | 22.94 | 0.17 | 1.53 | 2.30 | 0.05 | 0.79 | 0.52 | 1.18 | 1.42 |
| 800 | 47.72 | 13.72 | 30.93 | 0.17 | 1.86 | 4.64 | 0.03 | 0.94 | 0.84 | 2.25 | 2.93 |
| 900 | 42.25 | 9.51 | 33.65 | 0.17 | 5.45 | 6.18 | 0.05 | 2.75 | 1.09 | 3.54 | 4.84 |
| Inlet: 3 atm. CO2, 3 atm. H2S. | | | | | | | | | | | |
| 600 | 41.75 | 41.54 | 14.47 | 0.17 | 0.55 | 1.15 | 0.06 | 0.31 | 0.40 | 0.35 | 0.40 |
| 700 | 34.10 | 33.34 | 25.45 | 0.17 | 1.63 | 4.38 | 0.08 | 0.85 | 1.00 | 0.76 | 1.03 |
| 800 | 27.90 | 25.65 | 33.79 | 0.17 | 1.96 | 9.47 | 0.05 | 1.01 | 1.89 | 1.32 | 2.06 |
| 900 | 21.69 | 19.79 | 35.95 | 0.17 | 5.68 | 13.74 | 0.10 | 2.89 | 2.92 | 1.82 | 3.21 |
| Inlet: 2 atm. CO2, 4 atm. H2S. | | | | | | | | | | | |
| 600 | 25.91 | 58.88 | 12.72 | 0.17 | 0.50 | 1.44 | 0.09 | 0.29 | 0.60 | 0.22 | 0.26 |
| 700 | 19.03 | 51.00 | 21.73 | 0.17 | 1.45 | 5.72 | 0.12 | 0.79 | 1.74 | 0.43 | 0.65 |
| 800 | 13.48 | 43.20 | 27.50 | 0.17 | 1.70 | 12.97 | 0.09 | 0.89 | 3.96 | 0.64 | 1.24 |
| 900 | 8.61 | 37.43 | 26.99 | 0.17 | 4.65 | 19.52 | 0.21 | 2.43 | 7.67 | 0.72 | 1.76 |

TABLE II-B (PH2O = 0.01 atm)
(YLD = COS + 2CS2)

| T | % CO2 | % H2S | % COS | % H2O | % CO | % CS2 | % H2 | % S2 | YLD/CO2 | COS/H2S | YLD/H2S |
|---|-------|-------|-------|-------|------|-------|------|------|---------|---------|---------|
| Inlet: 8 atm. CO2, 4 atm. H2S. | | | | | | | | | | | |
| 600 | 55.44 | 21.78 | 20.14 | 0.08 | 0.56 | 1.68 | 0.02 | 0.29 | 0.42 | 0.92 | 1.08 |
| 700 | 48.31 | 14.18 | 30.67 | 0.08 | 1.48 | 4.49 | 0.02 | 0.75 | 0.82 | 2.16 | 2.80 |
| 800 | 43.92 | 8.97 | 37.21 | 0.08 | 1.67 | 7.29 | 0.01 | 0.84 | 1.18 | 4.15 | 5.77 |
| 900 | 39.69 | 5.81 | 38.60 | 0.08 | 4.75 | 8.66 | 0.02 | 2.38 | 1.41 | 6.64 | 9.62 |
| Inlet: 6 atm. CO2, 6 atm. H2S. | | | | | | | | | | | |
| 600 | 37.09 | 36.29 | 22.45 | 0.08 | 0.60 | 3.13 | 0.04 | 0.32 | 0.77 | 0.62 | 0.79 |
| 700 | 28.57 | 26.25 | 33.58 | 0.08 | 1.57 | 9.10 | 0.04 | 0.80 | 1.81 | 1.28 | 1.97 |
| 800 | 22.93 | 18.41 | 39.88 | 0.08 | 1.75 | 16.03 | 0.03 | 0.89 | 3.14 | 2.17 | 3.91 |
| 900 | 17.98 | 13.38 | 40.31 | 0.08 | 4.88 | 20.84 | 0.05 | 2.46 | 4.56 | 3.01 | 6.13 |
| Inlet: 4 atm. CO2, 8 atm. H2S. | | | | | | | | | | | |
| 600 | 21.68 | 53.85 | 19.47 | 0.08 | 0.53 | 4.03 | 0.06 | 0.30 | 1.27 | 0.36 | 0.51 |
| 700 | 14.04 | 43.78 | 27.51 | 0.08 | 1.36 | 12.43 | 0.08 | 0.72 | 3.73 | 0.63 | 1.20 |

TABLE II-B-continued (PH2O = 0.01 atm)
(YLD = COS + 2CS2)

| T | % CO2 | % H2S | % COS | % H2O | % CO | % CS2 | % H2 | % S2 | YLD/CO2 | COS/H2S | YLD/H2S |
|---|---|---|---|---|---|---|---|---|---|---|---|
| 800 | 9.05 | 35.27 | 30.14 | 0.08 | 1.44 | 23.22 | 0.06 | 0.75 | 8.46 | 0.85 | 2.17 |
| 900 | 5.44 | 29.91 | 27.26 | 0.08 | 3.73 | 31.51 | 0.13 | 1.93 | 16.60 | 0.91 | 3.02 |
| Inlet: 16 atm. CO2, 8 atm. H2S. | | | | | | | | | | | |
| 600 | 50.84 | 16.57 | 28.11 | 0.04 | 0.56 | 3.58 | 0.01 | 0.28 | 0.69 | 1.70 | 2.13 |
| 700 | 44.40 | 9.33 | 37.07 | 0.04 | 1.34 | 7.14 | 0.01 | 0.67 | 1.16 | 3.97 | 5.50 |
| 800 | 41.21 | 5.34 | 41.56 | 0.04 | 1.43 | 9.69 | 0.01 | 0.72 | 1.48 | 7.78 | 11.41 |
| 900 | 38.18 | 3.28 | 41.91 | 0.04 | 3.98 | 10.61 | 0.01 | 2.00 | 1.65 | 12.78 | 19.25 |
| Inlet: 12 atm. CO2, 12 atm. H2S. | | | | | | | | | | | |
| 600 | 31.55 | 29.47 | 31.01 | 0.04 | 0.59 | 7.02 | 0.02 | 0.31 | 1.43 | 1.05 | 1.53 |
| 700 | 23.48 | 18.95 | 29.83 | 0.04 | 1.40 | 15.57 | 0.02 | 0.71 | 2.60 | 1.57 | 3.22 |
| 800 | 19.07 | 12.10 | 43.56 | 0.04 | 1.47 | 23.01 | 0.01 | 0.74 | 4.70 | 3.60 | 7.40 |
| 900 | 15.44 | 8.27 | 42.79 | 0.04 | 4.03 | 27.37 | 0.03 | 2.03 | 6.32 | 5.17 | 11.79 |
| Inlet: 8 atm. CO2, 16 atm. H2S. | | | | | | | | | | | |
| 600 | 16.62 | 47.02 | 26.07 | 0.04 | 0.52 | 9.41 | 0.04 | 0.28 | 2.70 | 0.55 | 0.95 |
| 700 | 9.48 | 35.82 | 30.39 | 0.04 | 1.16 | 22.47 | 0.05 | 0.60 | 7.95 | 0.85 | 2.10 |
| 800 | 5.64 | 27.62 | 29.44 | 0.04 | 1.13 | 35.52 | 0.04 | 0.58 | 17.82 | 1.07 | 3.64 |
| 900 | 3.24 | 23.01 | 24.98 | 0.04 | 2.80 | 44.41 | 0.08 | 1.44 | 35.12 | 1.09 | 4.95 |

TABLE II-C (PH2O = 0.05 atm)
(YLD = COS + 2CS2)

| T | % CO2 | % H2S | % COS | % H2O | % CO | % CS2 | % H2 | % S2 | YLD/CO2 | COS/H2S | YLD/H2S |
|---|---|---|---|---|---|---|---|---|---|---|---|
| Inlet: 2 atm. CO2, 1 atm. H2S. | | | | | | | | | | | |
| 600 | 64.84 | 31.41 | 1.70 | 1.67 | 0.14 | 0.01 | 0.11 | 0.12 | 0.03 | 0.05 | 0.05 |
| 700 | 63.12 | 29.84 | 4.22 | 1.67 | 0.58 | 0.07 | 0.15 | 0.36 | 0.07 | 0.14 | 0.15 |
| 800 | 60.85 | 27.74 | 7.97 | 1.67 | 0.92 | 0.24 | 0.11 | 0.51 | 0.14 | 0.29 | 0.30 |
| 900 | 56.49 | 24.30 | 11.67 | 1.67 | 3.32 | 0.55 | 0.23 | 1.78 | 0.23 | 0.48 | 0.53 |
| Inlet: 1.5 atm. CO2, 1.5 atm. H2S. | | | | | | | | | | | |
| 600 | 48.05 | 47.90 | 1.92 | 1.67 | 0.15 | 0.02 | 0.15 | 0.15 | 0.04 | 0.04 | 0.04 |
| 700 | 46.13 | 46.09 | 4.76 | 1.67 | 0.62 | 0.11 | 0.21 | 0.41 | 0.11 | 0.10 | 0.11 |
| 800 | 43.55 | 32.66 | 8.98 | 1.67 | 0.98 | 0.43 | 0.16 | 0.57 | 0.23 | 0.27 | 0.30 |
| 900 | 38.84 | 39.75 | 12.93 | 1.67 | 3.53 | 0.99 | 0.35 | 1.94 | 0.38 | 0.33 | 0.38 |
| Inlet: 1 atm. CO2, 2 atm. H2S. | | | | | | | | | | | |
| 600 | 31.52 | 64.62 | 1.70 | 1.67 | 0.13 | 0.02 | 0.19 | 0.16 | 0.06 | 0.03 | 0.03 |
| 700 | 29.81 | 62.94 | 4.20 | 1.67 | 0.54 | 0.14 | 0.29 | 0.42 | 0.15 | 0.07 | 0.07 |
| 800 | 27.50 | 60.76 | 7.89 | 1.67 | 0.88 | 0.62 | 0.23 | 0.55 | 0.33 | 0.13 | 0.15 |
| 900 | 23.35 | 57.07 | 11.16 | 1.67 | 3.16 | 1.23 | 0.52 | 1.84 | 0.58 | 0.20 | 0.24 |
| Inlet: 4 atm. CO2, 2 atm. H2S. | | | | | | | | | | | |
| 600 | 64.38 | 31.02 | 3.33 | 0.83 | 0.19 | 0.04 | 0.07 | 0.13 | 0.05 | 0.11 | 0.11 |
| 700 | 61.54 | 28.36 | 7.81 | 0.83 | 0.72 | 0.23 | 0.09 | 0.41 | 0.13 | 0.28 | 0.29 |
| 800 | 58.09 | 24.95 | 13.69 | 0.83 | 1.06 | 0.75 | 0.06 | 0.56 | 0.26 | 0.55 | 0.61 |
| 900 | 52.95 | 20.73 | 18.39 | 0.83 | 3.61 | 1.47 | 0.13 | 1.87 | 0.40 | 0.89 | 1.03 |
| Inlet: 3 atm. CO2, 3 atm. H2S. | | | | | | | | | | | |
| 600 | 47.48 | 47.41 | 3.75 | 0.83 | 0.20 | 0.07 | 0.10 | 0.15 | 0.08 | 0.08 | 0.08 |
| 700 | 44.28 | 44.33 | 8.79 | 0.83 | 0.77 | 0.40 | 0.14 | 0.45 | 0.22 | 0.20 | 0.22 |
| 800 | 40.32 | 40.29 | 15.34 | 0.83 | 1.14 | 1.35 | 0.10 | 0.62 | 0.45 | 0.38 | 0.45 |
| 900 | 34.59 | 35.26 | 20.43 | 0.83 | 3.85 | 2.78 | 0.21 | 2.03 | 0.75 | 0.58 | 0.74 |
| Inlet: 2 atm. CO2, 4 atm. H2S. | | | | | | | | | | | |
| 600 | 31.05 | 64.24 | 3.33 | 0.83 | 0.18 | 0.08 | 0.14 | 0.16 | 0.11 | 0.05 | 0.05 |
| 700 | 28.19 | 61.41 | 7.75 | 0.83 | 0.69 | 0.49 | 0.19 | 0.44 | 0.31 | 0.13 | 0.14 |
| 800 | 24.62 | 57.68 | 13.41 | 0.83 | 1.02 | 1.69 | 0.15 | 0.58 | 0.68 | 0.23 | 0.29 |
| 900 | 19.62 | 52.96 | 17.40 | 0.83 | 3.41 | 3.56 | 0.34 | 1.87 | 1.25 | 0.33 | 0.46 |

TABLE II-D (PH2O = 0.05 atm.)
(YLD = COS + 2CS2)

| T | % CO2 | % H2S | % COS | % H2O | % CO | % CS2 | % H2 | % S2 | YLD/CO2 | COS/H2S | YLD/H2S |
|---|---|---|---|---|---|---|---|---|---|---|---|
| Inlet: 8 atm. CO2, 4 atm. H2S. | | | | | | | | | | | |
| 600 | 63.04 | 29.71 | 6.25 | 0.42 | 0.24 | 0.14 | 0.05 | 0.15 | 0.10 | 0.21 | 0.22 |
| 700 | 58.70 | 25.46 | 13.38 | 0.42 | 0.84 | 0.70 | 0.06 | 0.45 | 0.25 | 0.53 | 0.58 |
| 800 | 54.12 | 20.67 | 21.13 | 0.42 | 1.14 | 1.91 | 0.04 | 0.59 | 0.46 | 1.02 | 1.21 |
| 900 | 48.70 | 16.00 | 26.10 | 0.42 | 3.64 | 3.23 | 0.07 | 1.86 | 0.67 | 1.63 | 2.04 |
| Inlet: 6 atm. CO2, 6 atm. H2S. | | | | | | | | | | | |
| 600 | 45.93 | 45.88 | 7.03 | 0.42 | 0.26 | 0.25 | 0.07 | 0.16 | 0.16 | 0.15 | 0.16 |
| 700 | 40.98 | 40.87 | 14.99 | 0.42 | 0.90 | 1.26 | 0.09 | 0.49 | 0.43 | 0.37 | 0.43 |
| 800 | 35.63 | 34.94 | 23.51 | 0.42 | 1.21 | 3.59 | 0.06 | 0.64 | 0.86 | 0.67 | 0.88 |
| 900 | 29.46 | 29.05 | 28.67 | 0.42 | 3.86 | 6.44 | 0.13 | 1.99 | 1.41 | 0.99 | 1.43 |

TABLE II-D-continued (PH2O = 0.05 atm.)
(YLD = COS + 2CS2)

| T | % CO2 | % H2S | % COS | % H2O | % CO | % CS2 | % H2 | % S2 | YLD/CO2 | COS/H2S | YLD/H2S |
|---|---|---|---|---|---|---|---|---|---|---|---|
| Inlet: 4 atm. CO2, 8 atm. H2S. | | | | | | | | | | | |
| 600 | 29.68 | 62.89 | 6.22 | 0.42 | 0.23 | 0.30 | 0.09 | 0.16 | 0.23 | 0.10 | 0.11 |
| 700 | 25.22 | 58.24 | 13.15 | 0.42 | 0.81 | 1.58 | 0.13 | 0.47 | 0.65 | 0.23 | 0.28 |
| 800 | 20.38 | 52.56 | 20.23 | 0.42 | 1.09 | 4.64 | 0.09 | 0.59 | 1.45 | 0.38 | 0.56 |
| 900 | 15.07 | 46.89 | 23.68 | 0.42 | 3.36 | 8.58 | 0.21 | 1.79 | 2.71 | 0.51 | 0.87 |
| Inlet: 16 atm. CO2, 8 atm. H2S. | | | | | | | | | | | |
| 600 | 60.61 | 27.23 | 11.01 | 0.21 | 0.29 | 0.46 | 0.03 | 0.16 | 0.20 | 0.40 | 0.44 |
| 700 | 54.70 | 21.16 | 20.72 | 0.21 | 0.90 | 1.81 | 0.03 | 0.47 | 0.44 | 0.98 | 1.15 |
| 800 | 49.61 | 15.50 | 29.04 | 0.21 | 1.12 | 3.93 | 0.02 | 0.57 | 0.74 | 1.87 | 2.38 |
| 900 | 44.67 | 11.09 | 33.19 | 0.21 | 3.40 | 5.69 | 0.04 | 1.72 | 1.00 | 2.99 | 4.02 |
| Inlet: 12 atm. CO2, 12 atm. H2S. | | | | | | | | | | | |
| 600 | 43.13 | 42.95 | 12.36 | 0.21 | 0.31 | 0.82 | 0.04 | 0.18 | 0.32 | 0.29 | 0.33 |
| 700 | 36.27 | 35.54 | 23.08 | 0.21 | 0.96 | 3.39 | 0.05 | 0.51 | 0.82 | 0.65 | 0.84 |
| 800 | 30.13 | 28.06 | 31.94 | 0.21 | 1.19 | 7.83 | 0.03 | 0.61 | 1.58 | 1.14 | 1.70 |
| 900 | 24.35 | 21.97 | 35.85 | 0.21 | 3.57 | 12.17 | 0.07 | 1.82 | 2.47 | 1.63 | 2.74 |
| Inlet: 8 atm. CO2, 16 atm. H2S. | | | | | | | | | | | |
| 600 | 27.16 | 60.20 | 10.91 | 0.21 | 0.28 | 1.01 | 0.06 | 0.17 | 0.48 | 0.18 | 0.21 |
| 700 | 20.94 | 53.13 | 19.92 | 0.21 | 0.87 | 4.37 | 0.08 | 0.48 | 1.37 | 0.37 | 0.54 |
| 800 | 15.40 | 45.63 | 26.54 | 0.21 | 1.04 | 10.58 | 0.06 | 0.55 | 3.10 | 0.58 | 1.05 |
| 900 | 10.57 | 39.49 | 27.96 | 0.21 | 3.00 | 17.07 | 0.14 | 1.57 | 5.88 | 0.71 | 1.57 |

TABLE II-E (PH2O = 0.10 atm.)
(YLD = COS + 2CS2)

| T | % CO2 | % H2S | % COS | % H2O | % CO | % CS2 | % H2 | % S2 | YLD/CO2 | COS/H2S | YLD/H2S |
|---|---|---|---|---|---|---|---|---|---|---|---|
| Inlet: 2 atm. CO2, 1 atm. H2S. | | | | | | | | | | | |
| 600 | 64.50 | 31.03 | 0.83 | 3.33 | 0.08 | 0.00 | 0.12 | 0.10 | 0.01 | 0.03 | 0.03 |
| 700 | 63.57 | 30:15 | 2.14 | 3.33 | 0.35 | 0.02 | 0.17 | 0.26 | 0.03 | 0.07 | 0.07 |
| 800 | 62.26 | 29.00 | 4.26 | 3.33 | 0.59 | 0.07 | 0.13 | 0.36 | 0.07 | 0.15 | 0.15 |
| 900 | 59.39 | 26.68 | 6.64 | 3.33 | 2.24 | 0.17 | 0.29 | 1.27 | 0.12 | 0.25 | 0.26 |
| Inlet: 1.5 atm. CO2, 1.5 atm. H2S. | | | | | | | | | | | |
| 600 | 47.48 | 47.57 | 0.95 | 3.33 | 0.08 | 0.00 | 0.16 | 0.12 | 0.02 | 0.02 | 0.02 |
| 700 | 46.74 | 46.54 | 2.43 | 3.33 | 0.37 | 0.03 | 0.25 | 0.31 | 0.05 | 0.05 | 0.05 |
| 800 | 45.25 | 45.23 | 4.83 | 3.33 | 0.62 | 0.12 | 0.19 | 0.41 | 0.11 | 0.11 | 0.11 |
| 900 | 42.09 | 42.53 | 7.50 | 3.33 | 2.39 | 0.31 | 0.44 | 1.42 | 0.19 | 0.18 | 0.19 |
| Inlet: 1 atm. CO2, 2 atm. H2S. | | | | | | | | | | | |
| 600 | 31.18 | 64.24 | 0.84 | 3.33 | 0.07 | 0.01 | 0.21 | 0.14 | 0.03 | 0.01 | 0.01 |
| 700 | 30.27 | 63.25 | 2.14 | 3.33 | 0.32 | 0.04 | 0.33 | 0.32 | 0.07 | 0.03 | 0.04 |
| 800 | 28.95 | 62.11 | 4.24 | 3.33 | 0.55 | 0.14 | 0.27 | 0.41 | 0.16 | 0.07 | 0.07 |
| 900 | 26.17 | 59.50 | 6.52 | 3.33 | 2.12 | 0.37 | 0.62 | 1.37 | 0.28 | 0.11 | 0.12 |
| Inlet: 4 atm. CO2, 2 atm. H2S. | | | | | | | | | | | |
| 600 | 64.86 | 31.46 | 1.70 | 1.67 | 0.11 | 0.01 | 0.08 | 0.10 | 0.03 | 0.05 | 0.05 |
| 700 | 63.23 | 29.93 | 4.24 | 1.67 | 0.46 | 0.07 | 0.12 | 0.29 | 0.07 | 0.14 | 0.15 |
| 800 | 61.01 | 27.83 | 8.02 | 1.67 | 0.73 | 0.24 | 0.08 | 0.41 | 0.14 | 0.29 | 0.31 |
| 900 | 57.10 | 24.64 | 11.78 | 1.67 | 2.66 | 0.56 | 0.18 | 1.42 | 0.23 | 0.48 | 0.52 |
| Inlet: 3 atm. CO2, 3 atm. H2S. | | | | | | | | | | | |
| 600 | 48.08 | 47.96 | 1.92 | 1.67 | 0.12 | 0.02 | 0.12 | 0.12 | 0.04 | 0.04 | 0.04 |
| 700 | 46.25 | 46.20 | 4.78 | 1.67 | 0.49 | 0.11 | 0.17 | 0.33 | 0.11 | 0.10 | 0.11 |
| 800 | 43.72 | 43.78 | 9.04 | 1.67 | 0.78 | 0.43 | 0.13 | 0.45 | 0.23 | 0.21 | 0.23 |
| 900 | 39.38 | 40.04 | 13.21 | 1.67 | 2.84 | 1.02 | 0.28 | 1.56 | 0.39 | 0.33 | 0.38 |
| Inlet: 2 atm. CO2, 4 atm. H2S. | | | | | | | | | | | |
| 600 | 31.54 | 64.69 | 1.70 | 1.67 | 0.10 | 0.02 | 0.15 | 0.13 | 0.06 | 0.03 | 0.03 |
| 700 | 29.91 | 63.07 | 4.22 | 1.67 | 0.43 | 0.14 | 0.23 | 0.33 | 0.15 | 0.07 | 0.07 |
| 800 | 27.65 | 60.89 | 7.95 | 1.67 | 0.70 | 0.53 | 0.18 | 0.44 | 0.33 | 0.13 | 0.15 |
| 900 | 23.82 | 57.38 | 11.45 | 1.67 | 2.53 | 1.27 | 0.41 | 1.47 | 0.59 | 0.20 | 0.24 |

TABLE II-F (PH2O = 0.10 atm.)
(YLD = COS + 2CS2)

| T | % CO2 | % H2S | % COS | % H2O | % CO | % CS2 | % H2 | % S2 | YLD/CO2 | COS/H2S | YLD/H2S |
|---|---|---|---|---|---|---|---|---|---|---|---|
| Inlet: 8 atm. CO2, 4 atm. H2S. | | | | | | | | | | | |
| 600 | 64.41 | 31.06 | 3.34 | 0.83 | 0.15 | 0.04 | 0.06 | 0.11 | 0.05 | 0.11 | 0.11 |
| 700 | 61.67 | 28.44 | 7.85 | 0.83 | 0.58 | 0.23 | 0.07 | 0.32 | 0.13 | 0.28 | 0.29 |
| 800 | 58.27 | 25.03 | 13.77 | 0.83 | 0.85 | 0.75 | 0.05 | 0.45 | 0.26 | 0.55 | 0.61 |
| 900 | 53.47 | 20.93 | 18.74 | 0.83 | 2.90 | 1.52 | 0.10 | 1.50 | 0.41 | 0.90 | 1.04 |
| Inlet: 6 atm. CO2, 6 atm. H2S. | | | | | | | | | | | |
| 600 | 47.52 | 47.46 | 3.76 | 0.83 | 0.16 | 0.07 | 0.08 | 0.12 | 0.08 | 0.08 | 0.08 |

TABLE II-F-continued (PH2O = 0.10 atm.)
(YLD = COS + 2CS2)

| T | % CO2 | % H2S | % COS | % H2O | % CO | % CS2 | % H2 | % S2 | YLD/CO2 | COS/H2S | YLD/H2S |
|---|---|---|---|---|---|---|---|---|---|---|---|
| 700 | 44.42 | 44.43 | 8.83 | 0.83 | 0.61 | 0.04 | 0.11 | 0.36 | 0.20 | 0.20 | 0.20 |
| 800 | 40.50 | 40.38 | 15.44 | 0.83 | 0.91 | 1.36 | 0.08 | 0.49 | 0.45 | 0.38 | 0.45 |
| 900 | 35.11 | 35.45 | 20.85 | 0.83 | 3.10 | 2.86 | 0.17 | 1.63 | 0.76 | 0.59 | 0.75 |
| Inlet: 4 atm. CO2, 8 atm. H2S. | | | | | | | | | | | |
| 600 | 31.08 | 64.30 | 3.33 | 0.83 | 0.14 | 0.08 | 0.11 | 0.12 | 0.11 | 0.05 | 0.05 |
| 700 | 28.31 | 61.52 | 7.79 | 0.83 | 0.55 | 0.49 | 0.15 | 0.35 | 0.31 | 0.13 | 0.14 |
| 800 | 24.77 | 57.77 | 13.52 | 0.83 | 0.82 | 1.71 | 0.12 | 0.47 | 0.68 | 0.23 | 0.29 |
| 900 | 20.03 | 53.12 | 17.83 | 0.83 | 2.75 | 3.66 | 0.26 | 1.51 | 1.26 | 0.34 | 0.47 |
| Inlet: 16 atm. CO2, 8 atm. H2S. | | | | | | | | | | | |
| 600 | 63.09 | 29.75 | 6.26 | 0.42 | 0.19 | 0.14 | 0.04 | 0.12 | 0.10 | 0.21 | 0.22 |
| 700 | 58.83 | 25.53 | 13.45 | 0.42 | 0.67 | 0.71 | 0.04 | 0.36 | 0.25 | 0.53 | 0.58 |
| 800 | 54.29 | 20.72 | 21.25 | 0.42 | 0.91 | 1.92 | 0.03 | 0.47 | 0.46 | 1.03 | 1.21 |
| 900 | 49.17 | 16.11 | 26.54 | 0.42 | 2.92 | 3.30 | 0.06 | 1.49 | 0.67 | 1.65 | 2.06 |
| Inlet: 12 atm. CO2, 12 atm. H2S. | | | | | | | | | | | |
| 600 | 45.98 | 45.92 | 7.04 | 0.42 | 0.21 | 0.25 | 0.05 | 0.13 | 0.16 | 0.15 | 0.16 |
| 700 | 41.12 | 40.95 | 15.07 | 0.42 | 0.71 | 1.27 | 0.07 | 0.39 | 0.43 | 0.37 | 0.43 |
| 800 | 35.79 | 35.00 | 23.66 | 0.42 | 0.97 | 3.62 | 0.05 | 0.51 | 0.86 | 0.68 | 0.88 |
| 900 | 29.91 | 29.12 | 29.18 | 0.42 | 3.10 | 6.57 | 0.10 | 1.60 | 1.41 | 1.00 | 1.45 |
| Inlet: 8 atm. CO2, 16 atm. H2S. | | | | | | | | | | | |
| 600 | 29.72 | 62.94 | 6.24 | 0.42 | 0.18 | 0.30 | 0.07 | 0.13 | 0.23 | 0.10 | 0.11 |
| 700 | 25.34 | 58.31 | 13.23 | 0.42 | 0.64 | 1.59 | 0.10 | 0.37 | 0.65 | 0.23 | 0.28 |
| 800 | 20.51 | 52.60 | 20.38 | 0.42 | 0.87 | 4.68 | 0.07 | 0.47 | 1.45 | 0.39 | 0.57 |
| 900 | 15.40 | 46.90 | 24.20 | 0.42 | 2.71 | 8.77 | 0.17 | 1.44 | 2.71 | 0.52 | 0.89 |

The effective yield in terms of CO available for the shift reaction is equal to the sum of one mole of COS plus two moles of CS₂. The effective yield increases with pressure and also with temperature. Low H₂O pressure is expected to be practical at the higher temperatures, since several hydrates evolve their last molecule of water at rather high temperatures. $Ce_2(SO_4)_3 \cdot 8H_2O$ evolves the eighth water of hydration at 900° K., e.g.

The complete cycle of Version II includes the following steps, the first one of which may be selectively conducted in one of two modes.

1. Mode A: Conduct reactions II-1 and II-2 in the presence of a desiccant that absorbs H₂O. Mode B: Raise the reactor temperature to evolve H₂O and reconstitute the desiccant. The reactors could be used in parallel and the operational modes alternated. Or, Mode B could be operated intermittently with Mode A with the same reactor.
2. Separate COS and CS₂ from the CO₂+CO+H₂ fraction. It would not be necessary to separate unreacted H₂S from the CO₂ fraction. However, some H₂S would probably included with COS, so that a step to separate H₂ from COS might be desirable.
3. Add CO₂ (from the shift reaction) to equal the CS₂ in the COS+CS₂ fraction and heat to high temperature to produce CO and S₂(g).
4. Condense the S₂(g) to S₂(l).
5. Separate the small quantities of COS and CS₂ residual from step 3. Add to inlet gases for repetition of step 3 of the next cycle.
6. Use separated CO and the shift reaction to produce H₂ from H₂O.
7. Separate the H₂ from CO₂ by methods now used commercially for the shift process and use this CO₂ plus the CO₂ fraction from step 2, together with the required quantity of H₂S, as inlet gas to repeat the cycle.

A flow diagram for Version II is presented in FIG. II-A.

Table II-G presents concentrations of the various product gases formed at different pressures when COS is heated to 800°–1300° K.

TABLE II-G

THE THERMAL DECOMPOSITION OF COS

| T | % CO | % S2 | % COS | % CO2 & CS2 | CO/COS | CO/CO2 | COS/CS2 |
|---|---|---|---|---|---|---|---|
| Inlet: 1 atm. COS. | | | | | | | |
| 800 | 4.52 | 2.26 | 47.55 | 22.84 | 0.10 | 0.20 | 2.08 |
| 900 | 11.55 | 5.77 | 42.17 | 20.26 | 0.27 | 0.57 | 2.08 |
| 1000 | 22.39 | 11.20 | 33.93 | 16.24 | 0.66 | 1.38 | 2.09 |
| 1100 | 34.77 | 17.39 | 24.46 | 11.69 | 1.42 | 2.97 | 2.09 |
| 1200 | 45.57 | 22.78 | 16.20 | 7.73 | 2.81 | 5.90 | 2.10 |
| 1300 | 53.27 | 26.64 | 10.29 | 4.90 | 5.18 | 10.87 | 2.10 |
| 1400 | 58.16 | 29.08 | 6.54 | 3.11 | 8.89 | 18.70 | 2.10 |
| Inlet: 5 atm. COS. | | | | | | | |
| 800 | 2.69 | 1.35 | 48.94 | 23.51 | 0.05 | 0.11 | 2.08 |
| 900 | 7.11 | 3.55 | 45.57 | 21.88 | 0.16 | 0.32 | 2.08 |
| 1000 | 14.59 | 7.30 | 39.91 | 19.10 | 0.37 | 0.76 | 2.09 |
| 1100 | 24.50 | 12.25 | 32.34 | 15.46 | 0.76 | 1.58 | 2.09 |
| 1200 | 34.96 | 17.48 | 24.34 | 11.61 | 1.44 | 3.01 | 2.10 |
| 1300 | 44.11 | 22.05 | 17.33 | 8.26 | 2.55 | 5.34 | 2.10 |
| 1400 | 51.04 | 25.52 | 12.02 | 5.71 | 4.25 | 8.94 | 2.11 |
| Inlet: 10 atm. COS. | | | | | | | |
| 800 | 2.15 | 1.08 | 49.36 | 23.71 | 0.04 | 0.09 | 2.08 |
| 900 | 5.73 | 2.86 | 46.62 | 22.39 | 0.12 | 0.26 | 2.08 |
| 1000 | 11.97 | 5.98 | 41.92 | 20.06 | 0.29 | 0.60 | 2.09 |
| 1100 | 20.62 | 10.31 | 35.31 | 16.88 | 0.58 | 1.22 | 2.09 |
| 1200 | 30.37 | 15.18 | 27.87 | 13.29 | 1.09 | 2.29 | 2.10 |
| 1300 | 39.56 | 19.78 | 20.82 | 9.92 | 1.90 | 3.99 | 2.10 |
| 1400 | 47.08 | 23.54 | 15.06 | 7.16 | 3.13 | 6.58 | 2.10 |
| Inlet: 15 atm. COS. | | | | | | | |
| 800 | 1.88 | 0.94 | 49.56 | 23.88 | 0.04 | 0.08 | 2.08 |
| 900 | 5.04 | 2.52 | 47.15 | 22.64 | 0.11 | 0.22 | 2.08 |
| 1000 | 10.62 | 5.31 | 42.95 | 20.56 | 0.25 | 0.52 | 2.09 |
| 1100 | 18.55 | 9.27 | 36.90 | 17.64 | 0.50 | 1.05 | 2.09 |
| 1200 | 27.78 | 13.89 | 29.86 | 14.24 | 0.93 | 1.95 | 2.10 |
| 1300 | 36.84 | 18.42 | 22.91 | 10.91 | 1.61 | 3.38 | 2.10 |
| 1400 | 44.57 | 22.29 | 16.99 | 8.08 | 2.62 | 5.52 | 2.10 |

Heat Requirements for Version II. At temperatures of 600°–900° K., reactions II-1 and II-2 are each endothermic by about 8.3 kcal. However, each reaction produces H₂O(g) that will react with desiccant and evolve heat. Although a specific desiccant has not been selected, this quantity of heat can be estimated. The characteristic entropy change at 298° K. ($\Delta S^o(298)$) for the evolution of one mole of H₂O(g) from a hydrate (or hydroxide) is approximately 36 cal. Mole$^{-1}$ deg.$^{-1}$. A selected dissociation pressure at the reaction temperature also establishes a corresponding $\Delta G^o$. One can then estimate a value for $\Delta H^o(298)$ from the approximate expression $\Delta G^o(T) = \Delta H^o(298) - \Delta T\, S^o(298)$. For an H₂O pressure of 0.10 atm. at 600° K., the $\Delta H^o(298)$ would be about 24.3 kcal. For a pressure of 0.01 atm. at 700° K., $\Delta H^o(298)$ would be about 32.4 kcal. Thus, the hydration reaction associated with reactions II-1 and II-2 would evolve about 28.3 kcal. of heat and combined reactions would yield about 20 kcal. of heat per mole of CO eventually produced in step 2 above. The overall high temperature dissociation reactions would require about 27.5 kcal. The condensation of 0.5 mole of S₂ (at about 700° K.) would yield 13.4 kcal. The evolution of H₂O from the desiccant (step 7 above) would require about 28 kcal. Since the overall shift reaction is nearly thermally neutral (with liquid H₂O), one can summarize a heat balance as follows:

| | | |
|---|---|---|
| 1. Endothermic dissociation reaction at 1200–1300° K. | ($\Delta H$ = | +27.5 kcal.) |
| 2. Endothermic dehydration reaction at 900–1000° K. | ($\Delta H$ = | +28.5) |
| 3. Endothermic reactions (II-1, II-2, etc.) at 700° K. | ($\Delta H$ + | −20.0) |
| 4. Exothermic S₂ condensation at about 700° K. | ($\Delta H$ = | −13.4) |

The net 23 kcal heat requirement is not excessive. Further, the exothermic steps occur at sufficiently high temperatures for the heat to be readily usable. However, this exothermic heat must be used efficiently for some purpose for Version II to be practical.

VERSION III

This version is based on the following steps:

1. The reaction of CO with H₂S to form H₂ and COS and also CS₂ via the simultaneous reactions:

$$CO + H_2S = COS + H_2 \quad \text{(III-1)}$$

$$2COS = CS_2 + CO_2 \quad \text{(III-2)}$$

The equilibrium production of CS₂ is very important, since it essentially doubles the final yields of CO and H₂ which would occur from the formation of COS only.

2. Separation of the H₂S+COS+CS₂ fraction from the CO+H₂+CO₂ fraction.
3. Separation of COS+CS₂ from H₂S, as by use of membranes or molecular sieves.
4. Separation of H₂ from CO+CO₂, in similar manner.
5. Separation of CO₂ from CO, in similar manner
6. Thermal decomposition of COS and of CS₂ via the reactions:

$$COS = CO + 0.5 S_2(g) \quad \text{(III-3)}$$

$$CS_2 + CO_2 = 2CO + S_2(g) \quad \text{(III-4)}$$

7. Recovery of the sulfur by condensation.

A flow diagram of Version III is presented in FIG. III-A.

As an alternate sequence the CO+CO₂ from step 4 could be mixed with the CO and CS₂ (with some COS) remaining from step 7 and then combined with H₂S to constitute the inlet gas for step 1 to repeat the cycle. Recycled gases eventually reach steady-state compositions for a net yield of H₂+0.5S₂, completing the cycle. Small amounts of H₂O would also be produced during step 1 via the reaction:

$$H_2S + COS = CS_2 + H_2O \quad \text{(III-5)}$$

Computed equilibrium product compositions are given in Table III-A, for various temperatures and mixtures of inlet gases.

TABLE III-A

| T | % CO | % H2S | % COS | % H2 | % CO2 % CS2 | % H2O | H2/CO | COS/ H2S | CS2/ COS | CS2/ H2S | COS + 2CS2/ H2S |
|---|---|---|---|---|---|---|---|---|---|---|---|
| Inlet: 67% CO, 33% H2S. | | | | | | | | | | | |
| 500 | 55.80 | 22.46 | 5.56 | 10.87 | 2.66 | .00 | 0.19 | 0.25 | 0.48 | 0.12 | 0.48 |
| 600 | 56.57 | 23.24 | 5.15 | 10.10 | 2.47 | 0.02 | 0.18 | 0.22 | 0.48 | 0.11 | 0.43 |
| 700 | 56.99 | 23.66 | 4.93 | 9.67 | 2.37 | 0.04 | 0.17 | 0.21 | 0.48 | 0.10 | 0.41 |
| 800 | 57.22 | 23.88 | 4.82 | 9.45 | 2.32 | 0.09 | 0.17 | 0.20 | 0.48 | 0.10 | 0.40 |
| 900 | 57.33 | 24.00 | 4.76 | 9.33 | 2.29 | 0.16 | 0.16 | 0.20 | 0.48 | 0.10 | 0.39 |
| Inlet: 50% CO, 50% H2S. | | | | | | | | | | | |
| 500 | 38.26 | 38.26 | 6.00 | 11.75 | 2.87 | 0.01 | 0.31 | 0.16 | 0.48 | 0.08 | 0.31 |
| 600 | 39.11 | 39.11 | 5.55 | 10.90 | 2.67 | 0.03 | 0.28 | 0.14 | 0.48 | 0.07 | 0.28 |
| 700 | 39.57 | 39.57 | 5.32 | 10.43 | 2.55 | 0.07 | 0.26 | 0.13 | 0.48 | 0.06 | 0.26 |
| 800 | 39.82 | 39.82 | 5.19 | 10.18 | 2.49 | 0.15 | 0.26 | 0.13 | 0.48 | 0.06 | 0.26 |
| 900 | 39.95 | 39.95 | 5.13 | 10.05 | 2.46 | 0.27 | 0.25 | 0.13 | 0.48 | 0.06 | 0.25 |
| Inlet: 33% CO, 67% H2S. | | | | | | | | | | | |
| 500 | 22.46 | 55.80 | 5.56 | 10.87 | 2.66 | 0.01 | 0.48 | 0.10 | 0.48 | 0.05 | 0.19 |
| 600 | 22.24 | 56.57 | 5.15 | 10.10 | 2.47 | 0.04 | 0.45 | 0.09 | 0.48 | 0.04 | 0.18 |
| 700 | 23.66 | 56.99 | 4.93 | 9.67 | 2.37 | 0.10 | 0.41 | 0.09 | 0.48 | 0.04 | 0.17 |
| 800 | 23.88 | 57.22 | 4.82 | 9.45 | 2.32 | 0.22 | 0.40 | 0.08 | 0.48 | 0.04 | 0.17 |
| 900 | 24.00 | 57.33 | 4.76 | 9.33 | 2.29 | 0.38 | 0.39 | 0.08 | 0.48 | 0.04 | 0.16 |

It is apparent that relatively low reaction temperature would be advantageous for step 1. Catalysts may be used if necessary to achieve adequate reaction rates. Fukudu[11] describes the use of various metal sulfides which promise to be practical. U.S. Pat. No. 4,500,505 also discloses a class of catalysts based on combination of numerous elemental metals. The chosen catalysts must be such as to not also promote the disproportionation of CO₂ through the reaction:

$$2CO = CO_2 + C \tag{III-6}$$

For thermochemical equilibrium, this reaction must always occur at low temperature. However, it usually does not occur during the many processes that are conducted in commercial operations involving CO.

Yields for step 1 would not be penalized by high-pressure operation, being essentially independent of pressure. This would facilitate the complex gas separation steps of Version III. Inlet gas compositions may also be varied to change relative composition of gases in the different separation steps.

At 800° K., reaction (III-1) is exothermic by about 0.54 kcal. Reaction (III-2) is almost thermally neutral. The combined reactions should evolve about 0.5 kcal of heat. At a temperature of 1200° K., reaction (III-3) is endothermic by about 21.4 kcal. The reaction of $CO_2$ with $CS_2$ to produce COS is almost thermally neutral. Thus, this cycle variation would require about 21.5 kcal of high temperature heat. Condensation of 0.5 mole of $S_2$ at 700°-800° K. would yield about 13.4 kcal of high quality heat.

COMPARISON OF VERSIONS

Of the three methods for splitting $H_2S$, Version I is probably more easily developed. Some of the steps in this cycle are somewhat similar to those now practiced in the petroleum industry for producing $H_2$ by steam reforming of hydrocarbons and for producing sulfur by the previously mentioned Claus process. Assuming $(CH_2)_x$ or $(CH_{1.5})_x$ to be the hydrocarbon for the steam reforming step and also the fuel to produce combustion heat, and considering only the heat required for high temperature endothermic steps, Version I would save about 25% of the hydrocarbon needed for the steam reforming process. However, less valuable hydrocarbons would actually be used. Also, heat from the exothermic Claus process probably saves only less valuable fuel. Further analysis is needed of various fuel costs to establish actual monetary savings by use of Version I.

Version II is an interesting method for shifting equilibria in chemical reactions. The separation steps can probably be performed with good efficiency. However, the process will be advantageous only if heat from the exothermic steps can be used to good advantage in companion processes.

Version II requires less high temperature than the other two processes. The initial separation step presents no problems. Rapid progress has been made with membranes and molecular sieves used for adjusting gas compositions and for making gas separations, so that cycle Version III can undoubtedly be practically developed.

The invention may be embodied in still other specific versions and forms without departing from the spirit or essential characteristics thereof. The present embodiments and versions are, therefore, to be considered as illustrative and not restrictive, the scope of the invention being indicated by the appended claims rather than by the foregoing descriptions, and all changes that come within the meaning and range of equivalency of the claims are, therefore, intended to be embraced therein.

What is claimed and desired to be secured by United States Letters Patent is:

1. A method of recovery of sulfur and hydrogen from hydrogen sulfide, comprising the steps:
   initially reacting carbon dioxide with a portion of the hydrogen sulfide at temperatures not lower than approximately 900° K.;
   condensing the resultant gaseous sulfur to liquid sulfur;
   condensing the resultant steam to liquid water;
   separating the carbon dioxide + carbon monoxide + hydrogen fraction from the initial reaction leaving the sulfur bearing hydrogen sulfide + carbonyl sulfide + carbon disulfide fraction as a residual;
   reacting water with the carbon monoxide of the carbon dioxide + carbon monoxide + hydrogen fraction, resulting in hydrogen and additional carbon dioxide; and
   separating the hydrogen from the carbon dioxide.

2. The method of claim 1, comprising the further steps:
   recycling the residual separated hydrogen sulfide + carbonyl sulfide + carbon disulfide fraction to the initial step; and
   recycling the separated carbon dioxide to the step wherein carbon dioxide is reacted with hydrogen sulfide at temperatures not lower than approximately 900° K.

3. A method of recovery of sulfur and hydrogen from hydrogen sulfide, comprising the steps:
   initially reacting carbon dioxide with a portion of the hydrogen sulfide at a temperature below approximately 900° K., in the presence of a desiccant to absorb water resulting from the reaction, to increase yields of carbonyl sulfide and carbon disulfide;
   separating carbonyl sulfide and carbon disulfide from the carbon dioxide + carbon monoxide + hydrogen fraction from the initial reaction;
   adding carbon dioxide to carbonyl sulfide + carbon disulfide fraction and heating to a temperature not lower than approximately 800° K., to produce carbon monoxide and gaseous sulfur, along with residual carbonyl sulfide and carbon disulfide;
   condensing said sulfur;
   separating the residual carbonyl sulfide + carbon disulfide fraction;
   reacting water with the remaining carbon monoxide to produce hydrogen and carbon dioxide; and
   separating the hydrogen from the carbon dioxide.

4. The method of claim 3, comprising the further step:
   recycling the separated carbonyl sulfide + carbon disulfide fraction and the separated carbon dioxide to the step wherein carbon dioxide is reacted with carbonyl sulfide + carbon disulfide fraction at a temperature not lower than approximately 800° K.

5. The method of claim 3, wherein:
   the initial step is conducted in a reactor which is periodically raised to temperatures sufficient to evolve gaseous water from the desiccant, said water being removed from the reactor.

6. A method of recovery of sulfur and hydrogen from hydrogen sulfide, comprising the steps:
   initially reacting carbon monoxide with a portion of the hydrogen sulfide, producing carbonyl sulfide and hydrogen, accompanied by the simultaneous conversion of a portion of the carbonyl sulfide into carbon dioxide and equilibrium amounts of carbon disulfide;
   separating the hydrogen sulfide + carbonyl sulfide + carbon disulfide fraction of the initial reaction from the carbon monoxide+hydrogen+carbon dioxide fraction thereof;

separating the carbonyl sulfide and carbon disulfide together from the hydrogen sulfide, and the hydrogen from the carbon monoxide and carbon dioxide together;

separating the carbon dioxide from the carbon monoxide;

reacting the carbonyl sulfide, carbon dioxide and carbon disulfide at a temperature not lower than approximately 800° K., producing carbon monoxide and gaseous sulfur; and condensing the sulfur.

7. The method of claim 6, wherein:

the separated carbon monoxide and hydrogen sulfide are recycled for use in the initial reaction.

* * * * *